(12) United States Patent
McCaslin

(10) Patent No.: US 6,868,397 B1
(45) Date of Patent: Mar. 15, 2005

(54) EQUIPMENT INFORMATION SYSTEM AND METHOD

(75) Inventor: Thomas W. McCaslin, Haltom City, TX (US)

(73) Assignee: Basic Resources, Inc., Dallas, TX (US)

(*) Notice: Subject to any disclaimer, the term of this patent is extended or adjusted under 35 U.S.C. 154(b) by 0 days.

(21) Appl. No.: 09/580,536

(22) Filed: May 26, 2000

Related U.S. Application Data

(60) Provisional application No. 60/136,370, filed on May 28, 1999.

(51) Int. Cl.[7] .............................................. G06F 17/60
(52) U.S. Cl. ................................ 705/28; 705/22; 705/1
(58) Field of Search ...................... 705/22, 28; 235/385

(56) References Cited

U.S. PATENT DOCUMENTS

| | | | |
|---|---|---|---|
| 5,305,199 A | | 4/1994 | LoBiondo et al. ............ 364/403 |
| 5,786,998 A | | 7/1998 | Neeson et al. ............ 364/424.01 |
| 5,878,416 A | * | 3/1999 | Harris et al. .................... 707/10 |
| 6,032,121 A | * | 2/2000 | Dietrich et al. .................. 705/8 |
| 6,041,288 A | | 3/2000 | Ruffolo et al. ................ 702/184 |
| 6,098,050 A | * | 8/2000 | Knoblock et al. .............. 705/28 |
| 6,220,509 B1 | * | 4/2001 | Byford ........................ 235/375 |
| 6,237,051 B1 | * | 5/2001 | Collins ........................ 710/36 |

FOREIGN PATENT DOCUMENTS

WO    WO 98/43197    10/1998    ............ G06K/5/00

\* cited by examiner

Primary Examiner—Richard Chilcot
(74) Attorney, Agent, or Firm—Hunton & Williams LLP

(57) ABSTRACT

An exemplary equipment information system and method are provided that allow equipment inventory to be efficiently and effectively tracked, monitored, and evaluated. A method for managing equipment information is provided that includes storing attributes of a piece of equipment in an equipment information database when the equipment is received at a central inventory location, adding an indication in the equipment information database that the equipment is available inventory, receiving an order for equipment needed at a service center that is of the same type as the equipment, and allocating inventory to the order based on available inventory in the equipment information database. The method may further provide shipping the equipment for the order to the service center, installing the equipment, updating the equipment information database to indicate that the equipment has been installed, removing the equipment, updating the equipment information database that the equipment has been removed, and shipping the equipment to the central inventory location.

35 Claims, 47 Drawing Sheets

FIG. 10

Installation History

| | | |
|---|---|---|
| Company No: 9380295 | Ser No: 4660061192 | FLN: 28193229788 |
| Status: Active-Metered Load | Mfg: Kuhlman | GLN: 37136372775547 |
| Disposition: | Srv Ar/Yard: Round Rock | Link Fr Co#: |
| Purchase Date: 03/17/1993 | Issued W/R: | Link To Co#: |
| Address: LOST SPRING | | |

| Date | W/R | FLN | Phase | Serv Area | User |
|---|---|---|---|---|---|
| 12/07/1993 | 00001993 | 28193229788 | | Round Rock | CONV |

Removal History

| | | |
|---|---|---|
| Company No: 9802100 | Ser No: 98A421423 | FLN: 27535457639 |
| Status: Active-Metered Load | Mfg: ABB | GLN: |
| Disposition: | Srv Ar/Yard: Killeen | Link Fr Co#: |
| Purchase Date: 10/22/1998 | Issued W/R: | Link To Co#: |
| Address: 213 BLANKEt dr cpc | | |

| Date | W/R | FLN | Yard | User |
|---|---|---|---|---|

*FIG. 11*

Transfer History

| | | | | |
|---|---|---|---|---|
| Company No: 9802101 | Ser No: 98A421454 | | FLN: 36896592977204 | |
| Status: Active-Metered Load | Mfg: ABB | | GLN: | |
| Disposition: | Srv Ar/Yard: Killeen | | Link Fr Co#: | |
| Purchase Date: 10/22/1998 | Issued W/R: | | Link To Co#: | |
| Address: f.m. 3470 concrete plant | | | | |

| Transfer Date | From Location | Shipped by User | To Location | Stat |
|---|---|---|---|---|
| 11/03/1998 | SOS | DAVID DAVIS | KILLEEN | Complet |

Nameplate Maintenance History

| | | | | |
|---|---|---|---|---|
| Company No: 9802111 | Ser No: 98A421299 | | FLN: 22812272283 | |
| Status: Active-Metered Load | Mfg: ABB | | GLN: | |
| Disposition: | Srv Ar/Yard: Waxahachie | | Link Fr Co#: | |
| Purchase Date: 10/22/1998 | Issued W/R: | | Link To Co#: | |
| Address: hwy 287 bypass and rudd rd ennis | | | | |

| Date | Old Ser No | New Ser No | Old Tsn | New Tsn | Old Serv Area | New S |
|---|---|---|---|---|---|---|
| | | | | | | |

*FIG. 12*

Repair History

| | | | |
|---|---|---|---|
| Company No: 9802111 | Ser No: 98A421299 | | FLN: 22812272283 |
| Status: Active-Metered Load | Mfg: ABB | | GLN: |
| Disposition: | Srv Ar/Yard: Waxahachie | Link Fr Co#: | |
| Purchase Date: 10/22/1998 | Issued W/R: | Link To Co#: | |
| Address: hwy 287 bypass and rudd rd ennis | | | |

| Invoice Date | Invoice No | Repair Vendor | Repair Cost | Repair Category | Us |
|---|---|---|---|---|---|
| | | | | | |

Test Results History

| | | | |
|---|---|---|---|
| Company No: 9700001 | Ser No: 97465103 | | FLN: 8212235396 |
| Status: Active-Metered Load | Mfg: Central Moloney | | GLN: 38895783593145 |
| Disposition: | Srv Ar/Yard: Arlington | Link Fr Co#: | |
| Purchase Date: 10/06/1997 | Issued W/R: | Link To Co#: | |
| Address: 763 TAFT DR ARL | | | |

| Sample Date | PPM | Lab Id | Oil Spill Id |
|---|---|---|---|
| | | | |

*FIG. 13*

| Reclassification History | | | | | □ × |
|---|---|---|---|---|---|
Cancel

Reclassification History

Company No: 9700001  Ser No: 97465103  FLN: 8212235396
Status: Active-Metered Load  Mfg: Central Moloney  GLN: 38895783593145
Disposition:  Srv Ar/Yard: Arlington  Link Fr Co#:
Purchase Date: 10/06/1997  Issued W/R:  Link To Co#:
Address: 763 TAFT DR ARL

| Date | Activity | Yard | User | PTF | C |
|---|---|---|---|---|---|
| | | | | | |

---

On-Dock Quantities by Location and TSN

Cancel

On-Dock Quantities by Location and TSN

Report | Criteria

Yard:
TSN:
Size:
Primary Voltage:
Secondary Voltage:

Current Row No :          Total Records :

FIG. 14

| On-Dock Quantities by Location and TSN | | | | | | | |
|---|---|---|---|---|---|---|---|
| Yard | TSN | Description | Available | Allocated | Issued | Reserved | Damaged |
| ALEDO | 300796 | 25 CV 14.4 120/240 1B | 2 | | | | |
| ALEDO | 300810 | 50 CV 14.4 120/240 1B | 1 | | | | |
| ALEDO | 300932 | 25 DF 12470GY/7200-240/120V-II | 1 | | | | |
| ALEDO | 300948 | 50 DF 7.2 240/120-II | 1 | | | | |
| ALEDO | 300961 | 75 DF 7.2 240/120-II | 1 | | | | |
| ALEDO | 310398 | 37 CV 7.2 120/240 2B | 1 | | | | |
| ALEDO | 310792 | 10 CV 7.2 120/240 1B | 2 | | | | |
| ALEDO | 310793 | 15 CV 7.2 120/240 1B | 2 | | | | |
| ALEDO | 310794 | 25 CV 7.2 120/240 1B | 2 | | | | |
| ALEDO | 310796 | 37 CV 7.2 120/240 1B | 1 | | | | |
| ALEDO | 310798 | 50 CV 7.2 120/240 1B | 1 | | | | |
| ALEDO | 310803 | 10 CV 14.4 120/240 1B | 2 | | | | |
| ALEDO | 310804 | 15 CV 14.4 120/240 1B | 1 | | | | |

Current Row No : 1    Total Records : 20

Outstanding Orders

Report | Criteria

Yard — Location: ARLINGTON

Orders For:
- ⦿ All Transformers
- ○ Non B and B/3 Phase Only

Sort By:
- ⦿ TSN
- ○ Yard

Dates — ☑ All Dates

◄ May 1999 ►

| S | M | T | W | T | F | S |
|---|---|---|---|---|---|---|
| | | | | | | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 | | | | | |

*FIG. 15*

Outstanding Orders

Report | Criteria

```
Coordinator's Listing for 5/21/99
TSN: 300762    25 CSP 13200Y/7620-120/240V
Create Date  Need Date  Order No  Destination        WR#     Need  Alloc  Trans  Com
09/15/1998   04/20/1999   10990    ARLINGTON      1107434     1

Total for TSN: 300762                     1
TSN: 300782   100 CV 7200/12470Y-120/240 2B
Create Date  Need Date  Order No  Destination        WR#     Need  Alloc  Trans  Com
04/29/1999   06/24/1999   28082    ARLINGTON      1142922     1

Total for TSN: 300782                     1
TSN: 300796    25 CV 14.4-120/240 1B
Create Date  Need Date  Order No  Destination        WR#     Need  Alloc  Trans  Com
05/18/1999   05/26/1999   29633    ARLINGTON      1149560     1
```

TSNs Not Auto Re-Ordered by Yard

Location: FORT WORTH SOUTH

FORT WORTH SOUTH

| Tsn | Description |
|---|---|
| 300915 | 150 PAD 13.2-480Y/277 LF radial feed |
| 300936 | 300 PAD 13.2D-208Y/120V LOOP |
| 300938 | 300 PAD 13.2D-480Y/277 LF radial feed |
| 300941 | 300 PAD 24.9GY-480Y/277 LF radial feed |
| 300952 | 500 PAD 13.2D-208Y/120V LF radial feed |
| 300953 | 500 PAD 13.2-480Y/277 3PH |
| 301088 | 1000 VM 13200 DELTA-2400/4160Y |
| 301089 | 1000 VM 13200 DELTA-480Y/277V |
| 301093 | 1500 VM 13200 DELTA-480Y/277V |
| 311587 | 225 PAD AA-1,12.5 D-208Y/120V |

INSTALLATIONS/REMOVALS SECTION

Laptop Errors

[Resubmit] [Delete] [Cancel] Laptop Errors

Service Area [Decatur ▼] Status [ALL ▼]

[Summary] [Details]

| Transaction No | Date Entered | User Id | Type | Status | Error Message OR Address |
|---|---|---|---|---|---|
| 8 | 04/09/1999 | FDSB | Install | Complete | cr3420 |
| 273 | 08/24/1999 | FDSB | Install | Complete | Poco Plant Capacitor Bank |
| 243 | 08/27/1998 | IIHO | Install | Complete | 612 n wickham |
| 824 | 12/09/1998 | FDSB | Changeout | Complete | 15401 fm 920 pooolville |
| 409 | 11/06/1998 | FDSB | Install | Complete | 1102 salt creek road |
| 408 | 11/06/1998 | FDSB | Install | Complete | 392 private road 3762 |
| 808 | 12/08/1998 | FDSB | Removal | Complete | |
| 809 | 12/08/1998 | FDSB | Changeout | Complete | city of springtown |
| 810 | 12/08/1998 | FDSB | Install | Complete | hwy 380 runaway bay |
| 59 | 08/12/1998 | FDSB | Changeout | Complete | 502 Sewell Drive |
| 60 | 08/12/1998 | FDSB | Install | Complete | 610 Co.Rd. 2730 |
| 61 | 08/12/1998 | FDSB | Install | Complete | Slidell School water well |
| 954 | 01/04/1999 | FDSB | Changeout | Complete | LakeBRIDGEPORT Aston drive |
| 202 | 08/20/1998 | IIHO | Changeout | Complete | |

DIS/DEIS Transformer Discrepancies

[Save] [Delete] [Cancel]

DIS/DEIS Transformer Discrepancies

Service Area [Arlington ▼]

| Company # | FLN | GLN | Error Message |
|---|---|---|---|
| 7305744 | 8295927325 | 39000923513088 | Transformer active in DIS, inactive in DEIS |
| 9407676 | 8368334929 | 39053513588951 | Transformer active in DIS, inactive in DEIS |
| 8717022 | 7447526720 | 38149853504916 | Transformer active in DIS, inactive in DEIS |
| 7404425 | 8127028674 | 38827653526032 | Transformer active in DIS, inactive in DEIS |
| 8404523 | 7955232250 | 38646173561207 | Transformer active in DIS, inactive in DEIS |
| 8502934 | 8100531105 | 38794883550187 | Transformer active in DIS, inactive in DEIS |
| 9514039 | 8181135231 | 38865023591467 | Transformer active in DIS, not found in DEIS |
| 8100051 | 8029430760 | 38724433546568 | Transformer active in DIS, inactive in DEIS |
| 9513952 | 8229634979 | 38914303589080 | Transformer active in DIS, not found in DEIS |
| 9384545 | 8061429622 | 38759383535334 | Transformer active in DIS, not found in DEIS |
| 8606759 | 7992729052 | 38691873529481 | Transformer active in DIS, inactive in DEIS |
| 9514038 | 8227934560 | 38913733584908 | Transformer active in DIS, not found in DEIS |
| 9513974 | 8325534113 | 39012763580715 | Transformer active in DIS, not found in DEIS |

Current Record No : [1]    Total Records : [95]

*FIG. 21*

INVENTORY SECTION

Order Review

[Delete] [DeAllocate] [Allocate] [Order Entry] [Filter by TSN] [Cancel]

Order Review

Orders | Criteria

Yard
From: S O S    To: Arlington

Dates
Created: [    ] To [    ]
Modified: [    ] To [    ]

Order Type
Auto ☐
WMIS ☐
Manual ☐

Wr No
Wr No: [    ]

TSN
Tsn: [    ]
Size: [    ]
Kind: [    ]

Order Status
Outstanding ☐
Ready ☐
In-Transit ☐
Complete ☐
Allocated ☐

Order Review

[Delete] [DeAllocate] [Allocate] [Order Entry] [Filter by TSN] [Cancel]

Order Review

Orders | Criteria

Order

| Ord # | W/R | Created Date | Needed By Date | Modified Date | Modified By | TSN | Order Qty | Order Type |
|---|---|---|---|---|---|---|---|---|
| 10990 | 1107434 | 09-15-1998 | 04-20-1999 | 04-20-1999 | ESTP | 300762 | 1 | WMIS |
| 14874 | 1109799 | 10-30-1998 | 10-30-1998 | | esqz | 407339 | 1 | Manual |
| 16635 | 1027241 | 11-25-1998 | 11-27-1998 | | erqq | 319308 | 1 | WMIS |
| 19755 | 1124117 | 01-18-1999 | 01-18-1999 | | 12gq | 300822 | 1 | WMIS |

Order Details

TSN   Description                              Ord  Outst  Ready  Trans  Comp  Alloc
300762  25 CSP 13200Y/7620-120/240V              1    1
DETERIORATED POLE
—————————— Order Items ——————————

Total Records : 83

| Ship / Receive | | | | | | | | |
|---|---|---|---|---|---|---|---|---|

[ Ship ] [ Receive ] [ Cancel Transfer ] [ Sort ] [ Ship Other Equip ] [ Loading Doc ] [ Bill of Lading ]

[ Select All ] [ Deselect All ] [ Save ] [ Cancel ]

Ship / Receive

Ship/Receive | Search

| Co # | Serial # | TSN | W/R | Ord/Line | Qty | Status | From | To |
|---|---|---|---|---|---|---|---|---|
| 9930391 | 99J829203 | 425636 | 1113072 | 24333/1 | 1 | Available | S O S | IRVING |
| | | | 150 12470 Delta-480Y/277v DEADFRON | | | | | |
| 9930393 | 99J829328 | 425636 | 1113072 | 24334/1 | 1 | Available | S O S | IRVING |
| | | | 150 12470 Delta-480Y/277v DEADFRON | | | | | |
| 9827533 | 98J681348 | 317067 | 1004363 | 866/1 | 1 | Available | S O S | IRVING |
| | | | 750 PM 24.9GY/14.4-480Y/277v LF radial | | | | | |

---

Nameplate Maintenance

[ Save ] [ Cancel ]

Nameplate Maintenance

| Company # | Serv Area/Yard | Serial No | Manufacturer |
|---|---|---|---|
| 9835000 | Odessa | 98A232089 | ABB |

| Status | FLN | Link From Co # | Disposition |
|---|---|---|---|
| Active-Method | 2062641306 | | |

Location [ 1219 LINDBERG ST ]  Order No [ ]

Nameplate Data

| TSN | Description |
|---|---|
| 310398 | 37 CV 7.2 120/240 2B |

| Weight | Oil Type | Oil(gal) | Imepedance | Exciting Current | Core Loss | Load Loss |
|---|---|---|---|---|---|---|
| 1175 | LT1 PPM | 45 | 1.80 | 00 | 0 | 0 |

Comments

Crew

| Crew Name |
|---|
| MIKE MOWLES |
| MIKE UNDERWOOD |
| GEORGE LYONS |
| VICTOR MARTINEZ |
| RED SIMPSON |
| ROOTS |
| eagle pipeline danny cobbs |
| ABLES |
| ROUNDTREE |
| ROSS |
| CRABB |
| FRANCISCO |

Crew Yard

| Crew Name | Yard |
|---|---|
| Maintenance | ARLINGTON |
| BOBBIE KELLEY | DALLAS SW |
| JAMES PENDLETON | DALLAS SW |
| ERNIE HALL | DALLAS SW |
| J. O. JONES | DALLAS SW |
| BILL LUSTIG | DALLAS SW |
| DARREN WOODWARD | DALLAS SW |
| JAMES HENRY | DALLAS SW |
| RAUL RIOS | DALLAS SW |
| GERALD MCKENZIE | DALLAS SW |
| LARRY GREESON | DALLAS SW |
| BOBBY HILL | DALLAS SW |

*FIG. 27*

SOSF SECTION

Add New Transformers

Save    Cancel

Add New Transformers

Details
TSN [    ]    Manufacturer [   ▼]    Yard [ SOS ]

Identification

| Company # | Serial # |
|---|---|
|  |  |
|  |  |
|  |  |
|  |  |
|  |  |
|  |  |
|  |  |

Fill Orders

Cancel

Fill Orders

Location [ARLINGTON ▼]

Orders

| Order/Line | TSN | Outst Qty |
|---|---|---|
| 22610/1 | 310813-10 CV 7.2 240/480 2B | 1 |

Company Numbers

| Company No | Company No | Company No | Company No | Company No |
|---|---|---|---|---|
|  |  |  |  |  |

Company Number Change

Save  Cancel

Company Number Change

Company No: 9930900  New Company#: 
Serial #: 99J795042  Manufacturer: AB
Status: Available  Serv Area/Yard: HEB

Reclassification

Process  Cancel

Reclassification

| Company # | New Status | Ptf # | Construction Location |
|---|---|---|---|
| 9930001 | | | |

| Serial # | TSN | Description |
|---|---|---|
| 99J780212 | 300948 | 50 DF 7.2 240/120 - II |

Tsn Mfg Template

| Tsn | Manufacturer | Imp | Weight | Oil Type | Oil Ga |
|---|---|---|---|---|---|
| 310396 | Kuhlman | 1.60 | 435 | LT 1 PPM | |
| 310801 | Kuhlman | 1.90 | 345 | LT 1 PPM | |
| 300814 | Nix Electric | 2.20 | 860 | LT 1 PPM | |
| 310826 | Nix Electric | 2.30 | 250 | LT 1 PPM | |
| 310844 | Nix Electric | 2.00 | 840 | LT 1 PPM | |
| 321042 | Nix Electric | 3.50 | 1700 | LT 1 PPM | |
| 425687 | ABB | 1.96 | 3500 | LT 1 PPM | 1 |

TRANSPORTATION SCREENS

Load Detail

[Split Line] [Assign/Unassign to Load] [Change Route] [Create/Update Load] [Select All] [Cancel]

Route # DALLAS NW    Load # ALL

| To Yard | From Yard | Tsn | Description | Qty | Order No/Line |
|---|---|---|---|---|---|
| S O S | LAKE DALLAS | 300755 | 10 CSP 7.2 120/240 | 1 | |
| IRVING | S O S | 300796 | 25 CV 14.4-120/240 1B | 2 | 29963 /1 |
| LAKE DALLAS | S O S | 300796 | 25 CV 14.4-120/240 1B | 1 | 29541 /1 |
| LAKE DALLAS | S O S | 300796 | 25 CV 14.4-120/240 1B | 1 | 29497 /1 |
| LAKE DALLAS | S O S | 300796 | 25 CV 14.4-120/240 1B | 1 | 29608 /1 |
| LAKE DALLAS | S O S | 300948 | 50 DF 7.2 240/120 - II | 1 | 28809 /2 |
| LAKE DALLAS | S O S | 300948 | 50 DF 7.2 240/120 - II | 4 | 28985 /1 |
| S O S | LAKE DALLAS | 310792 | 10 CV 7.2 120/240 1B | 1 | |
| LAKE DALLAS | S O S | 310794 | 25 CV 7.2-120/240 1B | 1 | 29759 /1 |
| LAKE DALLAS | S O S | 310794 | 25 CV 7.2-120/240 1B | 1 | 29635 /1 |
| LAKE DALLAS | S O S | 310796 | 37 CV 7.2 120/240 1B | 1 | 29507 /1 |
| LAKE DALLAS | S O S | 310803 | 10 CV 14.4 120/240 1B | 1 | 26165 /1 |
| LAKE DALLAS | S O S | 310806 | 37 CV 14.4 120/240 1B | 1 | 29758 /1 |
| LAKE DALLAS | S O S | 310806 | 37 CV 14.4 120/240 1B | 1 | 26246 /1 |

Create/Update Loads

Save | Add Load | Del Load | Load Detail | Reports | Cancel

Create/Update Loads

Route: DALLAS NW

| Planned Ship Date | Load # | Driver | Truck | Trailer | Shipper | Status |
|---|---|---|---|---|---|---|
| 3/23/99 | 1967 | Roy Holland | 31354 | 31439 | TU Electric | In Transit |
| 3/31/99 | 1994 | Billy Cathey | 31234 | 30097 | TU Electric | In Transit |
| 4/28/99 | 2184 | Billy Cathey | 31234 | 30097 | TU Electric | In Transit |
| 4/13/99 | 2072 | Billy Cathey | 31234 | 30097 | TU Electric | In Transit |
| 4/20/99 | 2110 | Billy Cathey | 31234 | 30097 | TU Electric | In Transit |
| 4/20/99 | 2111 | Roy Holland | 31354 | 30079 | TU Electric | In Transit |
| 2/2/99 | 1664 | Joe Glasgow | 31355 | 31406 | TU Electric | In Transit |
| 2/16/99 | 1745 | Billy Cathey | 31234 | 30097 | TU Electric | In Transit |
| 5/4/99 | 2201 | Billy Cathey | 31234 | 30097 | TU Electric | In Transit |
| 2/9/99 | 1719 | Billy Cathey | 31234 | 30097 | TU Electric | In Transit |

Driver

Driver

| Driver Name | Default Truck No |
|---|---|
| Curtis Carter | 30639 |
| Joe Cornwell | 30322 |
| Billy Cathey | 31234 |
| Joe Glasgow | 31355 |
| Mike Harris | 31357 |
| Jay Overbeck | 30838 |
| Rodney Mathers | 31538 |
| Roy Holland | 31354 |

*FIG. 33*

Other Equipment Tsn

| Other Tsn | Other Tsn Desc | Other Unit Meas | Other Weight |
|---|---|---|---|
| 310045 | ENCLOSURE, SECONDARY | Each | 1800 |
| 316031 | CABINET,SWGR TERMIN | Each | 1800 |
| 315000 | OIL SWITCH | Each | 500 |
| 397475 | PALLET, WOOD 25X23 | Pallet | 30 |
| 397476 | PALLET, WOOD 25X28 | Pallet | 35 |
| 397477 | PALLET, WOOD 34X30 | Pallet | 40 |
| 397478 | PALLET, WOOD 48X40 | Pallet | 50 |

Route

| Route Code | Route Name | Cut Off Day 1 | Cut Off Hour 1 | Ship Day 1 | Cut Off Day 2 | Cut Off Hour 2 |
|---|---|---|---|---|---|---|
| 01 | WACO | Thursday | 10 | Monday | | |
| 03 | TEXOMA | Thursday | 10 | Monday | | |
| 02 | SOUTH | Thursday | 10 | Monday | | |
| 99 | SPECIAL | Monday | 10 | Wednesday | | |
| 19 | FT WORTH NORTH | Wednesday | 10 | Friday | | |

*FIG. 34*

FIG. 36
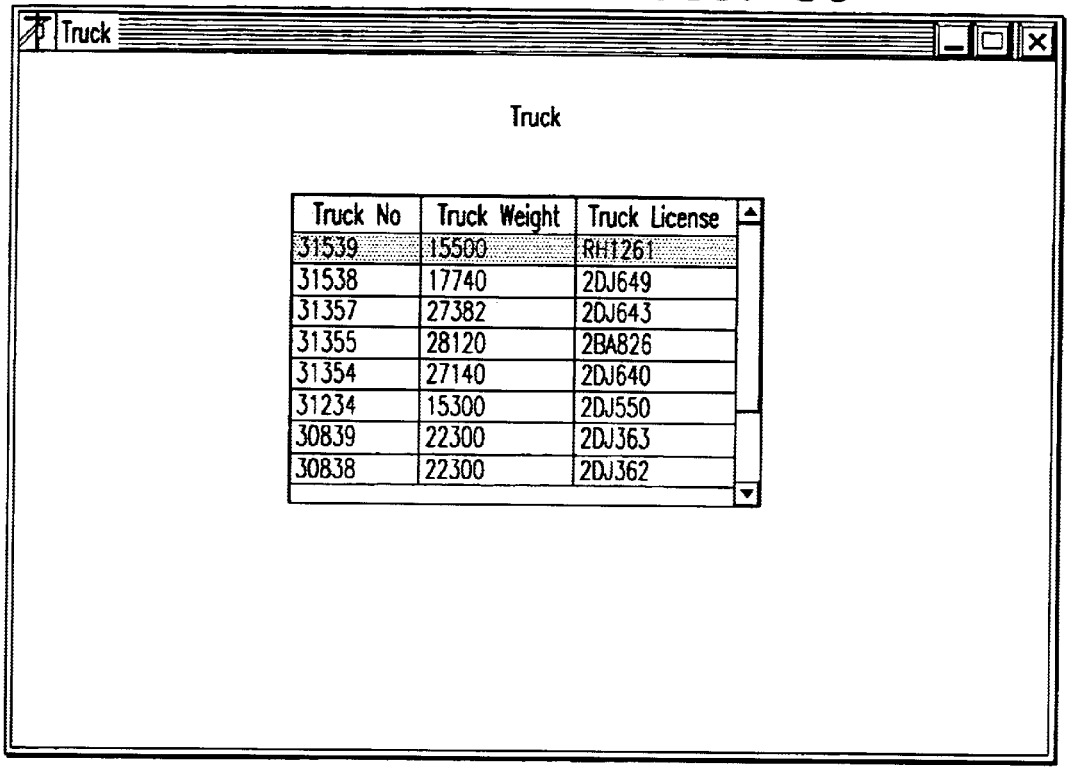
TABLE MAINTENANCE SECTION
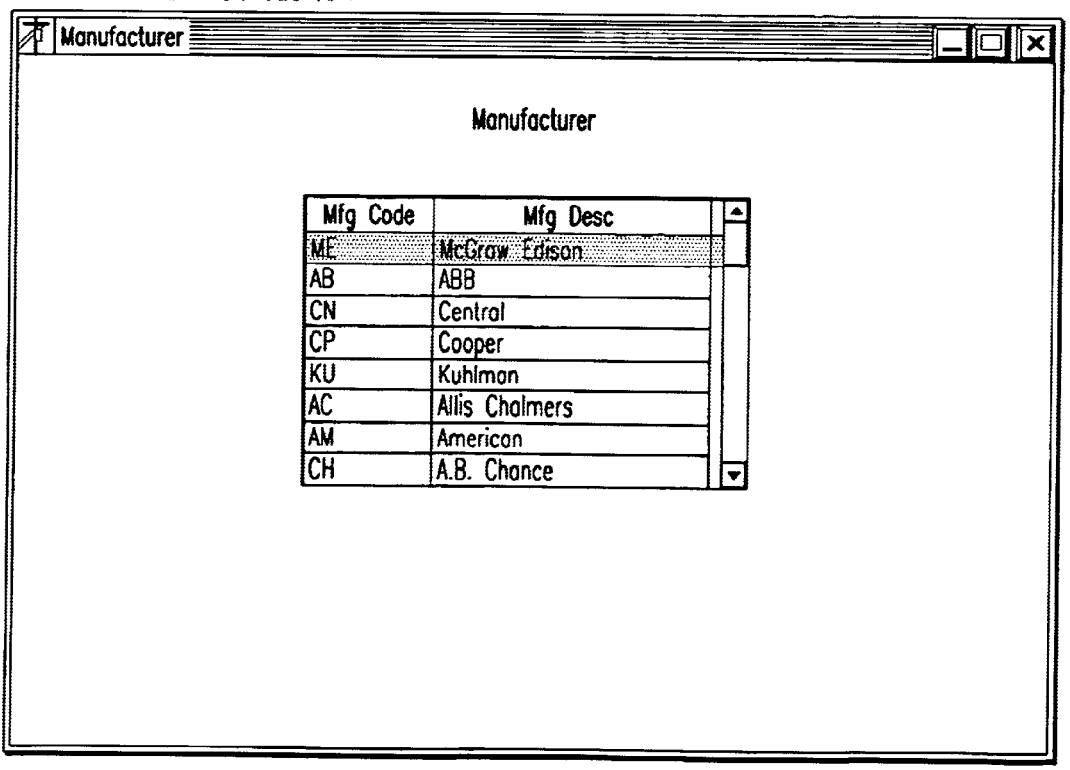

Area Security

| Default Serv Area | Additional Serv Area |
|---|---|
| Decatur | Lake Dallas |
| Arlington | HEB |
| ALL AREAS | Andrews |
| Arlington | Fort Worth N |
| Arlington | Grand Prairie |
| Big Spring | Lamesa |
| Big Spring | Midland |
| Brownwood | Eastland |

Inv Yard Security

| Default Yard | Additional Yard |
|---|---|
| ALL YARDS | ARLINGTON |
| ALL YARDS | ATHENS |
| ALL YARDS | BIG SPRING |
| ALL YARDS | BROWNWOOD |
| ALL YARDS | CLEBURNE |
| ARLINGTON | CLEBURNE |
| BIG SPRING | LAMESA |
| BROWNWOOD | STEPHENVILLE |

*FIG. 39*

Repair Vendor

| Repair Vendor Code | Repair Vendor Desc |
|---|---|
| SX | Miscellaneous SESCO |
| SS | SHOP at SOS |
| NI | Nix |
| CP | COOPER factory |
| SE | SESCO at SESCO |
| MX | Miscellaneous |
| AB | ABB factory |

Service Area

| Serv Area | Serv Area Name |
|---|---|
| SWT | Sweetwater |
| AND | Andrews |
| ARL | Arlington |
| ATH | Athens |
| BIG | Big Spring |
| GRH | Graham |
| BWD | Brownwood |
| FWS | Ft. Worth South |

*FIG. 42*

Tsn Reorder by Yord

| Yard | Tsn |
|---|---|
| FORT WORTH NORTH | 490260 |
| FORT WORTH NORTH | 490614 |
| FORT WORTH NORTH | 490662 |
| FORT WORTH SOUTH | 300915 |
| FORT WORTH SOUTH | 300936 |
| FORT WORTH SOUTH | 300938 |
| FORT WORTH SOUTH | 300941 |
| FORT WORTH SOUTH | 300952 |

User Security

| User Id | User Name | Inv Yard | Inst Remv Yard |
|---|---|---|---|
| RW/QM | KYLE ROLLINS | | PLANO |
| LLHE | STEVE MCCARLEY | | PLANO |
| FJML | DIANN BUTLER | S O S | S O S |
| LLHG | PAUL BINNION | | PLANO |
| ERTF | MARSHA ROGERS | ARLINGTON | ARLINGTON |

*FIG. 47*

EQUIPMENT INFORMATION SYSTEM AND METHOD

CROSS-REFERENCE TO RELATED APPLICATIONS

Pursuant to 35 U.S.C. § 119(e), this application claims the benefit of U.S. Provisional Patent Application No. 60/136,370 entitled Equipment Information System and Method, filed May, 28, 1999, and named Thomas W. McCaslin as inventor, and is also hereby incorporated by reference for all purposes.

TECHNICAL FIELD OF THE INVENTION

This invention relates in general to the field of information systems and more particularly to an equipment information system and method.

BACKGROUND OF THE INVENTION

The management of equipment inventory involves many different tasks that begins with the procurement of equipment and ending with the retirement or sale of such equipment. During the useful life of equipment, various information related to the equipment and associated tasks may need to be tracked and monitored, including, for example, procurement, installation, location, repair, testing, transportation/shipping, monitoring, evaluation, and historical record keeping. All of these present serious challenges to both unregulated and regulated companies. Regulated companies, such as electric utility distribution companies, must track, monitor, and evaluate additional information to meet regulatory requirements, such as for economic regulation and environmental compliance.

Electric utility distribution companies, for example, must manage large amounts of expensive capital equipment, such as distribution transformers, which must be procured, shipped, installed, monitored, repaired, and tested across, often, large geographic areas, while complying with all regulatory requirements related thereto. An adequate inventory of such distribution transformers must be managed so that transformers are stocked and available at appropriate locations when needed. A large volume of information is required to manage such equipment inventory and all of the associated tasks.

Equipment inventory, such as the electrical equipment mentioned above that is used by regulated electric utility distribution companies, are often extremely expensive and may account for a large portion of a companies overall assets. Such electrical equipment inventory may include, for example, transformers, voltage regulators, capacitors, relays, reclosures, and batteries. Excess equipment inventory may increase a companies overall holding or carrying costs, result in lower profits and lost investment opportunity, and may delay or reduce other needed capital expenditures. Inaccurate tracking and monitoring of equipment inventory could result in regulatory fines, such as those due to environmental violations and shipping violations.

Unfortunately, the tracking, monitoring, and evaluation of equipment inventory is often complex and involves many different systems due to the wide range of functions and tasks that are involved. This often requires software systems and multiple databases that must be constantly coordinated and synchronized to ensure accuracy and consistency in performing these tasks. These various systems are rarely, if ever, designed to work with one another and often only interface with one another through a manual process. This is expensive, cumbersome, and does not result in an optimal tracking, monitoring, and evaluation of equipment inventory.

The allocation of inventory at a central warehouse or central inventory location to fill orders from satellite warehouses or service centers can be complicated and time consuming. Once an order has been allocated, the transportation of large, and often expensive equipment, such as distribution transformers, present numerous challenges and opportunities for inefficiencies.

SUMMARY OF THE INVENTION

From the foregoing it may be appreciated that a need has arisen for an equipment information system and method that allows equipment inventory to be efficiently and effectively tracked, monitored, and evaluated. In accordance with the present invention, an equipment information system and method are provided that substantially eliminate one or more of the disadvantages and problems outlined above.

According to an aspect of the present invention, an equipment information system is provided that includes various modules and a database that may include various tables of data or information. The various modules may include a table maintenance module, an inquiry module, an inventory module, a transportation module, and an installations/removals module.

According to another aspect of the present invention, a method for managing equipment information is provided that includes storing attributes of a piece of equipment in an equipment information database when the equipment is received at a central inventory location, adding an indication in the equipment information database that the equipment is available inventory, receiving an order for equipment needed at a service center that is of the same type as the equipment, and allocating inventory to the order based on available inventory in the equipment information database. The method may further provide shipping the equipment for the order to the service center, installing the equipment, updating the equipment information database to indicate that the equipment has been installed, removing the equipment, updating the equipment information database that the equipment has been removed, and shipping the equipment to the central inventory location.

The present invention provides a profusion of technical advantages that include the capability to efficiently and effectively track, monitor, evaluate, and manage equipment inventory. This may be achieved using a single database that includes multiple tables, or using multiple databases.

Another technical advantage of the present invention includes the capability to quickly, efficiently, and accurately know the current status of your equipment assets, including inventory levels, so that these inventory levels may be optimized to reduce or minimize overall holding or carrying costs.

A further technical advantage of the present invention includes the capability to automatically interface with other systems, such as, for example, a work management information system, a procurement and accounts payable system, financial information management system, and a graphics systems. In this manner, database information that is common between the various systems is synchronized, accurate, and current, and duplication of effort is minimized and overall efficiency is increased.

Yet another technical advantage includes the versatility to allow a company to provide better service by eliminating or minimizing situations where equipment is not in inventory or is not available at the appropriate location when needed by a customer. Stated differently, equipment inventory may be better managed between locations, warehouses, or service centers to ensure that the right asset or equipment is at the correct location. Users are also provided the added advantage of being able, in one system, to quickly and efficiently identify the location and status of the most eligible piece of equipment to transport in the event of an emergency situation.

Another technical advantage of the present invention includes the capability to establish reasonable balanced performance measures to evaluate such metrics as quality, service, and costs. Further, the performance of the various equipment inventory locations can be evaluated, along with the performance of personnel, equipment vendors, equipment manufacturers, and suppliers.

Still other technical advantages of the present invention include the capability to: (1) provide automated reports that contain information for performance measures; (2) train a user in minimal time and cost because of the ease of use of the system; (3) provide historical equipment information that assists with regulatory compliance, such as environmental, transportation, and financial regulations; (4) automatically generate forms that assist with regulatory compliance and operational efficiencies, such as Department of Transportation ("DOT") forms and bills of lading; (5) provide enhanced security and reliability by limiting personnel to only those portions of the system in which they are concerned; (6) provide automatic order capability from service centers to the central inventory location; (7) provide automatic reorder capability to replace equipment used from the service centers for recent installations to ensure adequate inventory at service centers at all times; (8) automatically allocate orders for equipment to be provided from a central inventory location to a service center; (9) deallocate orders; and (10) provide the flexibility to operate in both a regulated, an unregulated, and a mixed regulated, unregulated environment. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIGS. 9 through 17 provide an exemplary set of Graphical User Interfaces (GUIs) that may be used provide inquiry module functionality;

FIGS. 18 through 21 provide an exemplary set of Graphical User Interfaces (GUIs) that may be used provide installations/removals module functionality;

FIGS. 22 through 27 provide an exemplary set of Graphical User Interfaces (GUIs) that may be used provide inventory module functionality;

FIGS. 28 through 31 provide an exemplary set of Graphical User Interfaces (GUIs) that may be used to provide inventory module functionality that may only be accessed by certain users, such as at a central inventory location;

FIGS. 32 through 35 provide an exemplary set of Graphical User Interfaces (GUIs) that may be used to provide transportation module functionality; and FIGS. 36 through 50 provide an exemplary set of Graphical User Interfaces (GUIs) that may be used provide table maintenance module functionality;

DETAILED DESCRIPTION OF THE INVENTION

It should be understood at the outset that although an exemplary implementation of the present invention is illustrated below, the present invention may be implemented using any number of techniques and that may be used to track, allocate, monitor, and evaluate virtually any type of equipment, such as, for example, electrical distribution equipment. The present invention should in no way be limited to the exemplary implementations, drawings, and techniques illustrated below, including the exemplary software and hardware design and implementation illustrated and described herein.

Figure 1:
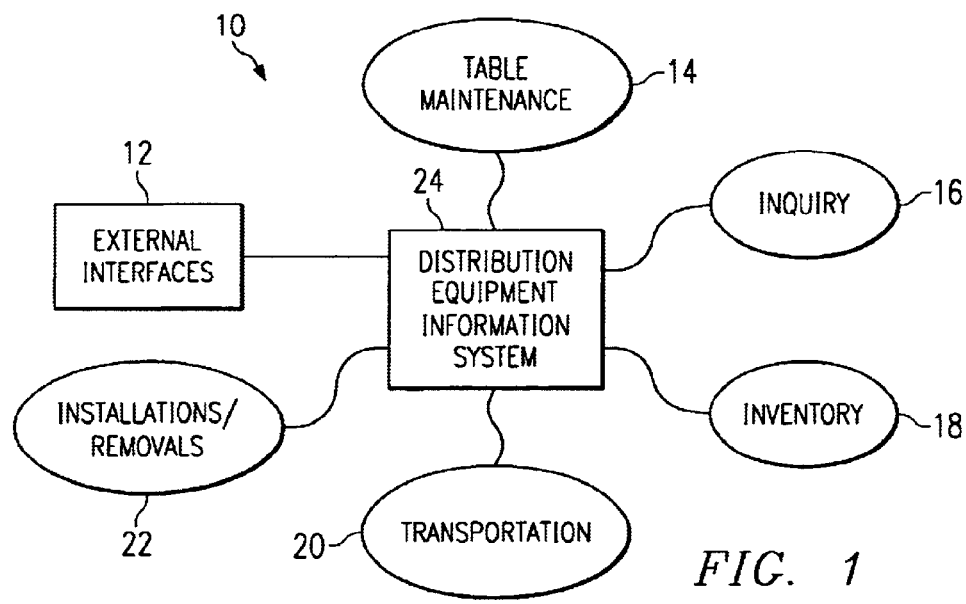
FIG. 1 is an overview block diagram of an exemplary embodiment of an Equipment Information System ("EIS") that is implemented as a Distribution Equipment Information System ("DEIS")

FIG. 1 is an overview diagram 10 of an exemplary embodiment of an Equipment Information System ("EIS") that is implemented as a Distribution Equipment Information System ("DEIS") 24 for tracking, allocating, defalcating, monitoring, and evaluating the equipment inventory that is commonly found and used by electric utility distribution companies. In a preferred embodiment, the DEIS 24 is implemented using a distributed computer architecture, such as a client/server architecture, that provides "fat" client functionality and a centralized server database. The DEIS 24 may be implemented in a preferred embodiment using various modules and at least one database that will generally include various tables. For example, the DEIS 24 may include a table maintenance module 14, an inquiry module 16, an inventory module 18, a transportation module 20, and an installations/removals module 22. Each of these modules are implemented in software and provide various functionality which are described more fully below. It should be understood that the various modules illustrated in FIG. 1 and described below may be implemented and organized as one or more programs, code, instructions, subroutines, objects, processes, methods, or any and all combinations thereof.

The table maintenance module 14 provides system maintenance functions for various tables contained within the main database of the DEIS 24. The inquiry module 16 is used to query the database and the various tables and information stored within the DEIS 24 so that both standard reports and ad hoc reports may be generated. In one embodiment, the inquiry module 16 is implemented using a database management software tool such as MICROSOFT ACCESS, while the main database of the DEIS 24 is implemented as an ORACLE database.

The inventory module 18 provides the capability to receive, track, allocate, deallocate, monitor, and evaluate equipment and orders, such as electrical distribution equipment including, for example, transformers, capacitors, switch gear, oil switches, regulators, reclosures, batteries, and voltage regulators, and any other equipment used in or in connection with a business. The inventory module 18 may also provide, assist, or interface with the capability to track the location of this equipment between various service centers or locations. It will, in a preferred embodiment, provide current information as to the inventory not only at a central inventory location or central warehouse, but at satellite warehouses or service centers, sites, yards, or locations.

The transportation module 20 provides the management and tracking functionality of the transport of equipment from one location to one or more other locations, for example, from a central location or center, to various satellite locations or centers. This may include, for example, the automatic generation of bills of lading, and loading documents. The central location, where equipment inventory may be generally received and distributed to other locations, may also be the location where equipment is repaired, maintained, transported, retired, tested, and where any number of other functions are performed.

Figure 2:
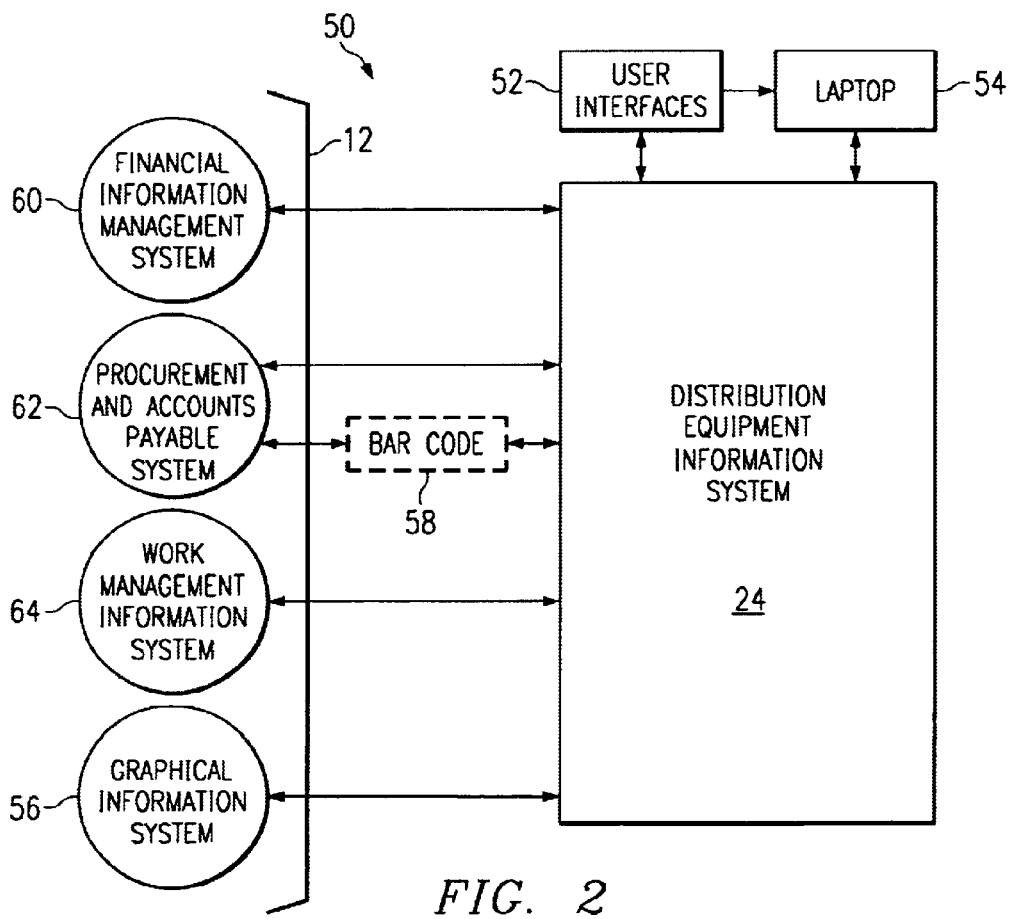
FIG. 2 is a block diagram that illustrates various exemplary interfaces, including both I/O interfaces and interfaces with external computer systems, that may be provided with the DEIS.

The installations/removals module 22 provides the functionality to manage or determine whether a piece of equipment is installed or is in service, or has been removed or is out of service. It may also include the capability to provide additional equipment information such as the field location number, which indicates the geographic or physical location of the equipment in service, such as the physical location on or in the electrical distribution system where the equipment is installed or located. In one embodiment, the installations/removals module 22 may interface with an external interface of external interfaces 12, such as a distribution information system, a work management system, or a graphical information system. For example, the graphical information system, which is illustrated in FIG. 2 and described more fully below in connection therewith, may interface with the installations/removals module 22 of the DEIS 24 to exchange information. For example, when a transformer (or other equipment) is installed in a distribution circuit of an electric utility distribution company, the installations/removals module 22 may provide various attributes or information to the graphical information system. This provides the significant advantage of eliminating the need to enter the same information in multiple systems, ensures data consistency across systems, and, often, will result in more accurate data.

The DEIS 24 may also interface with any of a number of other computer systems through any of a variety of known or available interfaces, as represented by the external interfaces 12, to both receive and/or deliver or exchange information. Further, the DEIS 24 may include any number of available input/output mechanisms which allow for data to be input or output from the system such as, for example, graphical user interfaces ("GUIs"), bar code devices, and electronic inputs such as batch file exchanges.

FIG. 2 is a block diagram 50 that illustrates various exemplary interfaces, including both I/O or user interfaces and interfaces with external computer systems, such as the external interfaces 12, that may be provided with the DEIS 24. The various user interfaces include the user interfaces 52, where a user may simply and conveniently access various GUIs of the DEIS 24, each such GUI being normally associated with one or more of the modules of the DEIS 0.24, to access and/or exchange information with the DEIS 24. A laptop or remote interface 54 is shown that allows a user or field personnel to provide various inputs to the DEIS 24 in an off-line mode and later dock or connect with the DEIS 24 where the information may then be downloaded to the DEIS 24.

The DEIS 24 may also interface through the external interfaces 12 with an external system that provides financial and/or property accounting functions. This is represented by a Financial Information Management System 60, which, in one embodiment, is a property accounting system that provides property accounting functions, such as those that are required by both a regulated and an unregulated entity. In this manner, information is automatically and seamlessly provided between two separate systems so that information is accurately updated and maintained between the two systems.

An interface to another external system is indicated by a Procurement and Accounts Payable System ("PAPS") 62. The PAPS 62 allows the DEIS 24 to request that certain equipment be ordered through the PAPS 62 so that PAPS 62 may generate an appropriate purchase order for use in ordering the requested equipment. The PAPS 62 also may track accounts payable after such purchase order has been receive or after an invoice has been received for an equipment manufacturer. In other embodiments, the various functionality of the PAPS 62 may be provided in two or more separate external systems.

A bar code interface 58 is illustrated in FIG. 2 and represents the fact that a bar code scanner may be used to input various information into the DEIS 24. The bar code interface 58 may also be used to supply information simultaneously or nearly simultaneously to a separate system such as the PAPS 62. For example, the bar code interface 58 may be used to scan and input equipment nameplate information, such as, for example, the manufacturer, the serial number, and other attributes of the equipment. This may be used by the DEIS 24 to track the location and the transportation of the piece of equipment that has been received. The PAPS 62 and the DEIS 24 may be used in, conjunction when a piece of equipment, such as a transformer, is originally received from a vendor or manufacturer. Input information, such as the serial number and other identifying and desired information, may be input into both the PAPS 62 and the DEIS 24 using the bar code interface 58. The PAPS 62 may use this input information so that accounts payable may be properly adjusted to reflect that a payment is due to the appropriate vendor or manufacturer of the received equipment. The DEIS 24 now has an initial record of the equipment to begin tracking and managing the "birth-to-death" associated information of the equipment and to ensure that equipment orders received internally are properly processed and equipment is delivered to desired service centers or subcenters as requested.

Finally, the DEIS 24 may also interface with a distribution information system that may include the capability or functionality of either or both a Work Management Information System ("WMIS") 64 and/or a Graphical Information System ("GIS") 56. The WMIS provides the capability for personnel in the field, such as engineering personnel, to estimate the particular needs of a job such that the job equipment estimation system will in turn generate the required equipment that is estimated to be needed for the job. The WMIS 64 may then, once a job is approved, provide such equipment needs to the DEIS 24 along with a need date and location. The DEIS 24 will then generate an order from the In other embodiments, the DEIS 24 may provide inventory and/or availability information to the WMIS 64. In one embodiment, information is not provided from the WMIS 64 until the particular job that has been estimated has been approved in the WMIS 64, which indicates that the need to order such equipment is more certain.

An interface to an external computer system is indicated by the GIS 56, which represents an external graphics system that, in one embodiment, provides one line graphical representations of an electrical distribution system that may be used to generate one line charts, and that includes information about the physical and electrical characteristics of a distribution system so that engineering studies may be run. The DEIS 24 may automatically provide such information to the GIS 56 to eliminate the need for a user to provide such information manually into the GIS 56. This also provides the added and significant advantage of ensuring that information in two independent systems remains current and synchronized.

Figure 3:
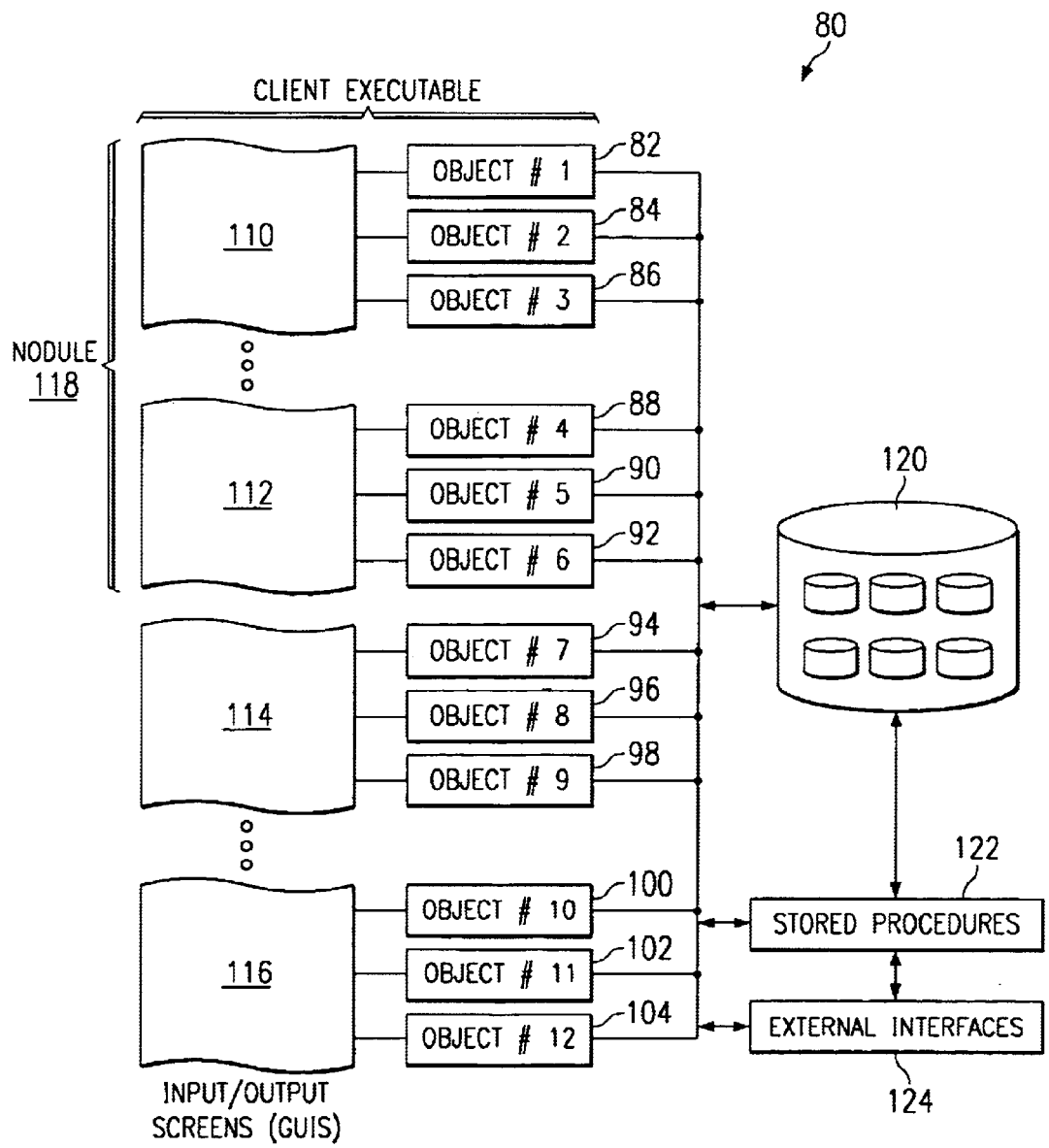
FIG. 3 is a diagram of an exemplary software architecture of an equipment information system.

FIG. 3 is a diagram of an exemplary software architecture of an equipment information system 80, such as the DEIS 24. Along the left side of FIG. 3 are representative GUIs or windows 110 through 116, such as the GUIs described herein in connection with FIGS. 9 through 50. Each of the GUIs has an associated logic that may be developed as scripts using a programming tool called POWERBUILDER by SYBASE. These scripts may result in the generation of objects, such as objects 82 through 104, for use by such GUIs as is illustrated.

One or more of the GUIs and their associated logic, which is contained in the one or more objects that are associated with each GUI, may be grouped into modules or libraries, such as the exemplary groupings discussed above for the five modules of the exemplary DEIS 24 illustrated in FIG. 1 and discussed above. For example, a module 118 is shown that includes GUI or windows 110 through 112, and corresponding objects 82 through 92, which provide, in one embodiment, event driven logic based on a user's selection on the associated GUI. This logic may be a database query, a mathematical operation, a sort, or virtually any available and desired logic.

The DEIS 24 may be implemented using any number of available software development and programming tools such as, for example, POWERBUILDER or VISUAL BASIC by MICROSOFT. In one embodiment, POWERBUILDER may be used to develop an individual library for each of the five modules discussed throughout and as illustrated in FIG. 1 such that all of the GUIs and their associated logic or objects for each module are contained in the individual library. These individual libraries are referred to as POWERBUILDER libraries and are designated with a "pbl" extension. A build may then be performed with all of the five libraries, and some of the standard libraries provided with. POWERBUILDER to generate a single executable file. Depending on a desired hardware configuration, this single executable file may be distributed to virtually any client that can access a server through a network, such as a local area network, a wide area network, a token ring network, and the like.

A database 120 of the equipment information system 80 is shown such that it can exchange information to and from the various GUIs and objects of the modules or libraries as illustrated in FIG. 3. Preferably, the database will be implemented as a relational database at a server and will include a database manager such that the objects of the various GUIs and modules may initiate various database commands to interrogate the information and various table of the database. The database manager also preferably provides for stored procedures, such as stored procedure 122, to be developed and executed such that stored procedures may also access the information of the database. The stored procedures may be initiated automatically, such as at defined or periodic intervals, through other stored procedures, or through objects of the GUIs. In a preferred embodiment, the database is implemented as an ORACLE database manager at a server and the executable code is provided at one or more clients.

External interfaces 124 includes both I/O interfaces and interfaces with external systems, and may also initiate stored procedures and may communicate or exchange information with the various modules and their GUIs and objects. This is also illustrated in FIG. 3.

Figure 4:
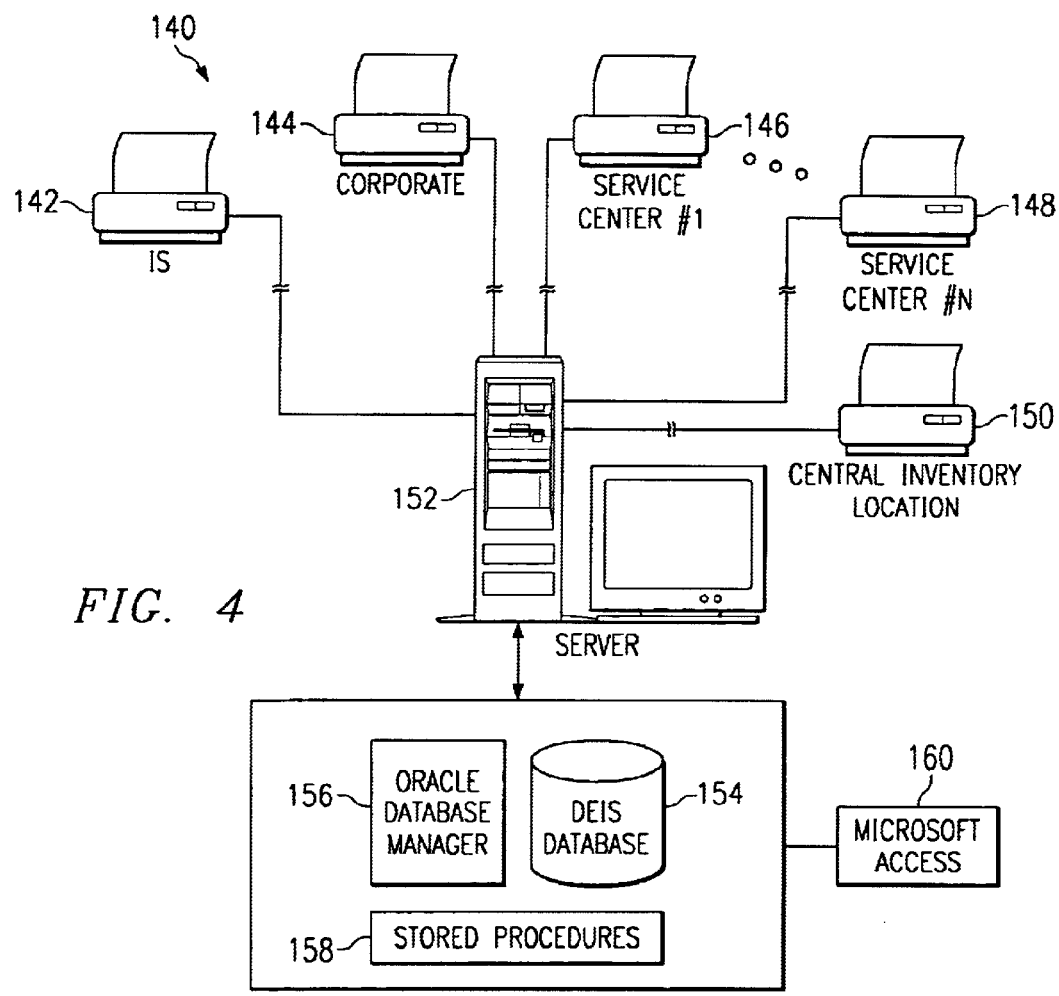
FIG. 4 is a diagram of an exemplary computer hardware configuration that may be used to implement an equipment information system.

FIG. 4 is a diagram of an exemplary computer hardware configuration that may be used to implement an equipment information system 140, such as the DEIS 24 discussed above. In the preferred embodiment shown, various clients may communicate with a server 152 and each of the clients has an executable that provides the five modules discussed above along with their associated GUIs and objects. Each of these clients preferably operate under a WINDOWS or equivalent operating system that provide a GUI. An information client 142, a corporate client 144, a service center #1 client 146, a service center #n client 148, and a central inventory location client 150 are shown in FIG. 4. The client software at the central inventory location client 150 will, in a preferred embodiment, contain or provide access to more functionality, especially in the inventory module to provide such functionality, for example, as manual allocation of orders. The central inventory location client 150 may also exclusively provide access to load creation GUIs, and associated objects, to provide load creation functionality as part of the transportation module or the inventory module.

In the preferred embodiment, because the vast majority of the executable code for the equipment information system 140 resides on the client, the clients may be referred to as "fat" clients. The server 152 will host a equipment information system database 154 using a database management tool, application, or system, such as an ORACLE database manager 156. This allows for stored procedures 158 to be run at the server 152 that act on the data in the database 154 and associated tables. The stored procedures 158 may be setup to execute automatically, such as every night, through another stored procedure, or on demand when selected or initiated through a window or GUI. In still other implementations, the stored procedures may be implemented by external systems through an interface with the external system, not shown in FIG. 4.

An off-line, near real-time version or copy of the equipment information database 154 may also be provided and accessed by a separate database manager 160 that may or may not be located or active at the server. For example, MICROSOFT ACCESS may be used to access the DEIS database 154 to generate virtually any desired report. This may be referred to as a report manager.

Figure 5:
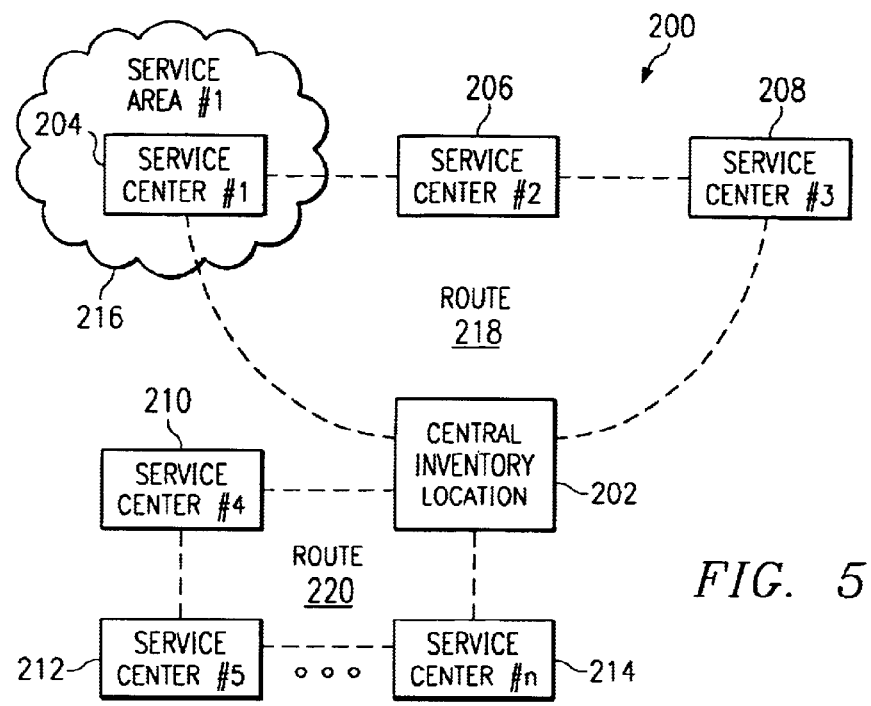
FIG. 5 is an overview diagram that illustrates a central inventory location and several exemplary routes to several service centers.

FIG. 5 is an overview diagram 200 that illustrates a central inventory location 202 and several exemplary routes to several service centers. The present invention may be used in such a system to manage the transportation, generally using the transportation module, to manage the transportation of equipment from the central inventory location 202 to various service centers on a route, and to retrieve equipment from such service centers to transport to the central inventory location 202.

A route to supply and retrieve equipment, such as distribution equipment like an electrical transformer, is generally defined and driven using a truck/trailer combination. A route 218 is illustrated with a dashed line connecting the central inventory location 202, a service center 204, which serves a service area 216, a service center 206, and a service center 208. Similarly a route 220 is illustrated with a dashed line connecting the central inventory location 202, a service center 210, a service center 212, and a service center 214. It should be noted that even though only service center 216 is shown in FIG. 5, generally, each service center will be responsible for a certain defined service area or areas.

Figure 6:
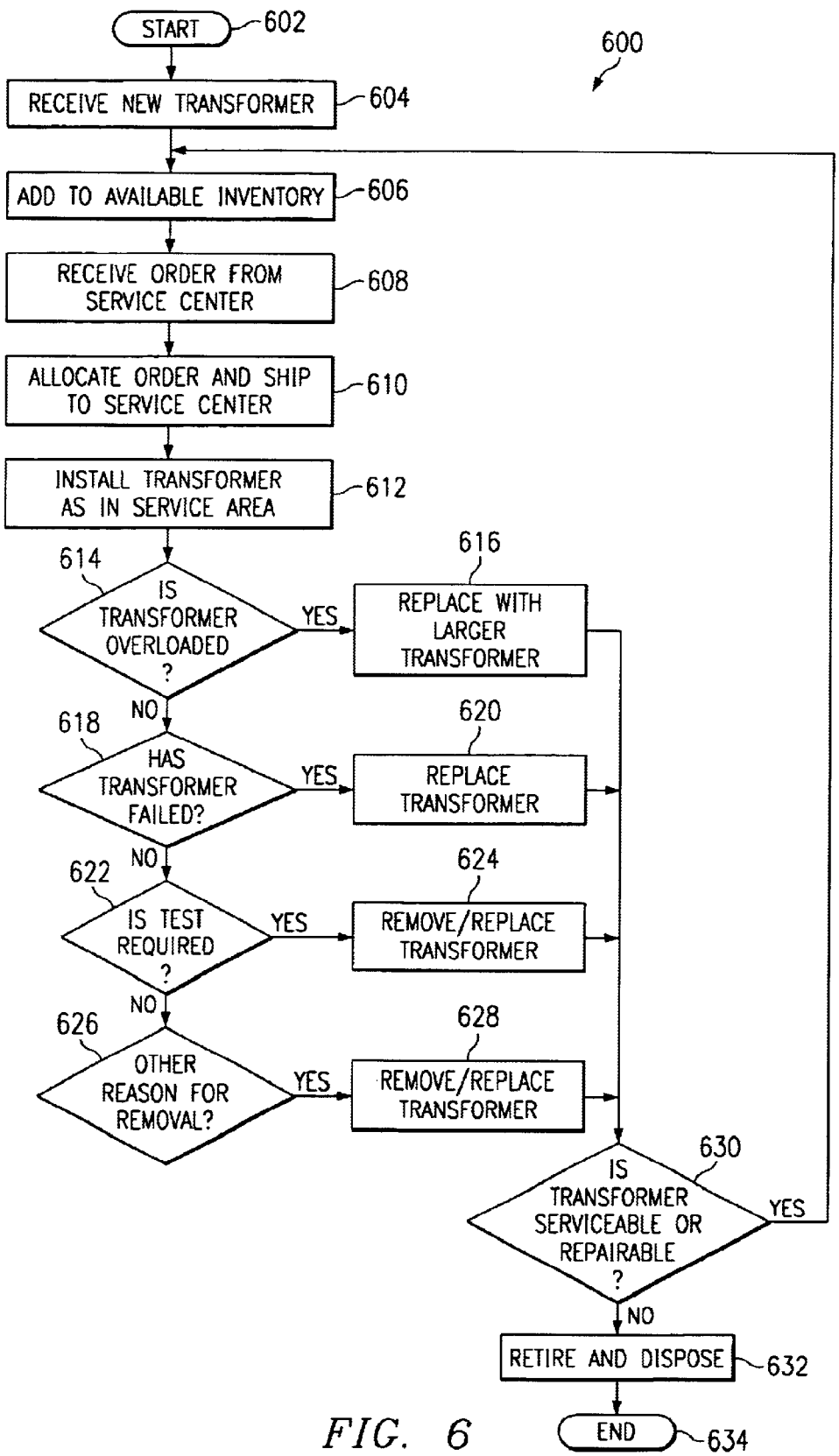
FIG. 6 is a flow chart illustrating a method for managing equipment information for a transformer from "birth-to-death"

FIG. 6 is a flow chart illustrating a method 600 for managing equipment information for a transformer from "birth-to-death". The method 600 begins at block 602 and proceeds to block 604 where a new transformer is received at, for example, a central inventory location. Next at block 606, the nameplate of the transformer is entered into the equipment information system using, preferably, a bar code scanner. The information may include a serial number, manufacturer, an SKU number, and virtually any available or desired information.

The method 600 proceeds next to block 608 where an order is entered or generated, either manually or automatically, into or by the equipment information system for a transformer. At block 610, the order is allocated by the equipment information system as to inventory at the central distribution location. The transformer is then shipped to a service center. At block 612 the transformer is installed into an electrical system and is in service. The method 600 proceeds next to several decision blocks 614, 618, 622, and 626 where, generally the transformer is monitored to see if for any reason, such as, for example, the transformer becomes overloaded, fails, needs a test performed (such as a test for PCB in transformer fluids), or for any other reason needs to be taken out of service. If yes, the transformer is generally removed and replaced, as is clear in the flow chart of the method 600. At such point in time the transformer is no longer serviceable or repairable, as is shown in decision block 630, the transformer is retired and properly disposed as required. The method 600 ends at block 634.

Figure 7:
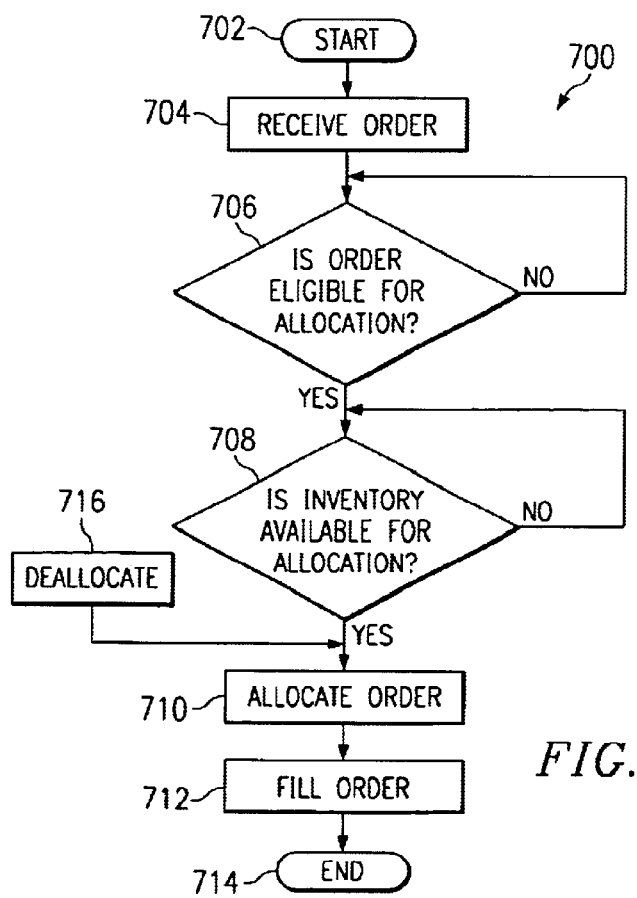
FIG. 7 is a flow chart illustrating a method for processing, allocating, and filling an order according to an embodiment of the present invention.

FIG. 7 is a flow chart illustrating a method 700 for processing, allocating, and filling an order according to an embodiment of the present invention. The method 700 begins at block 702 and proceeds to block 704 where an order is received or generated in the equipment information system. Orders may be manually entered into the equipment information system, automatically generated to reorder equipment at a service or satellite center, or through an external interface. The method 700 proceeds next to decision block 706, where it waits until such time as an order is found to eligible for allocating. In a preferred embodiment, the order contains the need day or date for the ordered or requested equipment. Until such time as the actual date approaches a window leading up to the need date, the order is not eligible to be allocated. After such time the order is eligible to be allocated.

Proceeding next to decision block 708, where it waits until such time as inventory is available, normally at a central inventory location, to be allocated to this order. When the inventory is available the order is allocated at block 710. The allocation is not necessarily corresponded to individual equipment, but classes of available equipment, such as by the number of available equipment of a particular type as classified by an SKU or other identifying number.

If certain events happen, such as emergency conditions, previously allocated orders may be deallocated, as indicated by block 716. This may be done manually, or automatically according to some criteria. The order is filled and shipped in block 712, and the method 700 ends at block 714. Allocation may be achieved through various ways, such as by using stored procedures.

It should be noted that the allocation may not specifically identify individual pieces of equipment by their unique identifier, such as their unique company number, at this time. Deallocation may also occur if an order is canceled. In the event that the threshold time period before the order is to be filled has been met and the allocation has occurred, if the order is later canceled, the allocation can then be deallocated. This is automatically achieved once the order is canceled. Equipment inventory may also be manually deallocated if a user determines that even though a prior allocation has already occurred, a superior or more urgent need for the equipment exists. In such a case, a user may access a manual GUI in the DEIS 24 and deallocate a certain quantity of units of a particular stock order number.

The allocation/deallocation processing, in addition to what was described above, may also provide partial allocations, such as when insufficient inventory is on hand when an order must be allocated and/or shipped. It can process substitute stock order numbers, provide capability to handle order cancellations and work request cancellations, such as work request cancellations from a job equipment estimation system such as WMIS. All of this functionality may be achieved through the use of stored procedures to manipulate a database and with the use of logic to perform additional functions and to perform database manipulations. Some of the processing involved in the allocation or deallocation processing involves the use of batch processing, while other needed processing may be provided on demand or as needed.

Figure 8:
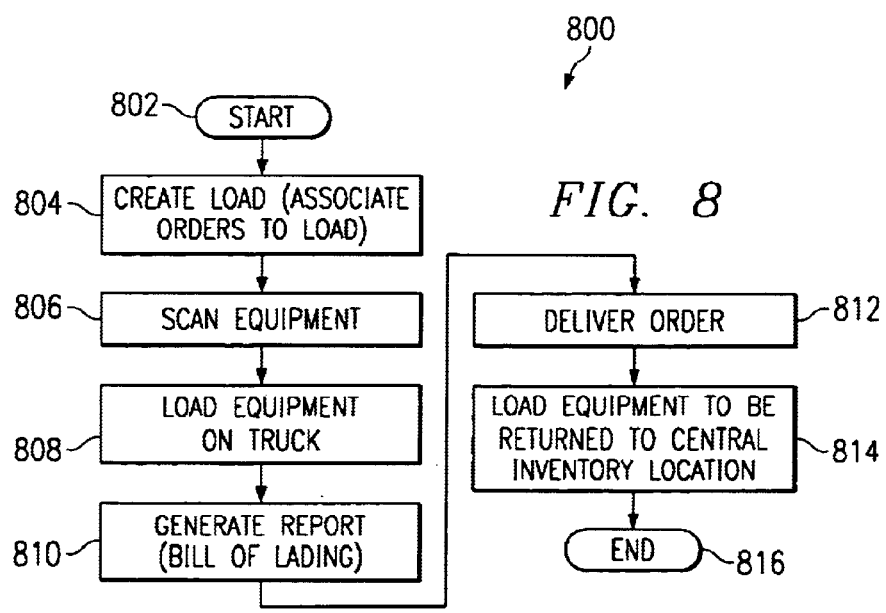
FIG. 8 is a flow chart illustrating a method for filling and transporting equipment according to an embodiment of the present invention.

FIG. 8 is a flow chart illustrating a method 800 for filling and transporting equipment according to an embodiment of the present invention. The method starts at 802 and proceeds to 804 where a load is created, which means allocated orders are now associated with individual items of equipment. The equipment is scanned at block 804, loaded on a truck at block 808, a transportation report, such as a bill of lading is generated and other reports for the particular route and various service center stops are generated as needed or required.

The equipment is delivered to a service center on the route at block 810, any equipment scheduled to be picked up is done so at block 814 for shipment back to the central inventory location, and the method ends at block 816. FIGS. 9–17 provide an exemplary set of Graphical User Interfaces (GUIs) that may be used provide inquiry module functionality. In general, this module provides the flexibility to develop virtually any inquiry to check on almost any aspect of the DEIS 24. Various tables of the database of the DEIS 24 may be interrogated to generate output results.

Figure 9:
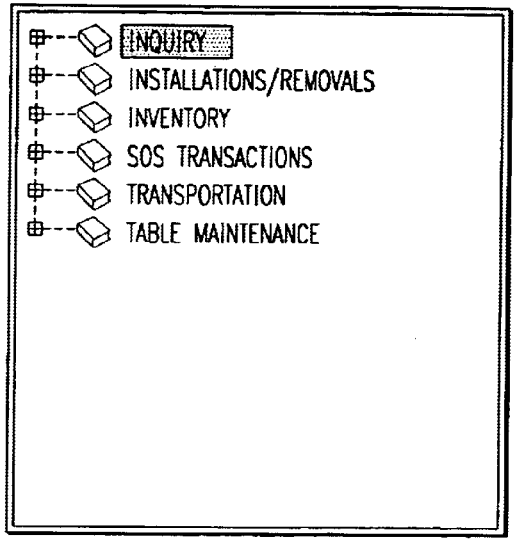

FIG. 9 illustrates a Tree View Menu GUI and an Inquiry GUI. The Tree View Menu GUI is a diagram of screen inputs that includes a menu, similar to FIG. 1, which may be referred to or thought of as the main menu of the DEIS 24. As illustrated, this includes selections for the inquiry module, the installations/removals module, the inventory module, the SOS transactions module (which provides additional access or makes available certain GUIs relevant to a central inventory location and, in one embodiment, related primarily to the inventory module), the transportation module, and the table maintenance module. Each of the GUIs and their functions are discussed below.

Once the inquiry module is chosen, the user is presented with the Inquiry GUI as illustrated in FIG. 9. The Inquiry GUI provides three fields to possibly receive input. This includes the company number, which may be a unique identifier for each piece of equipment, a serial number, and a field location number. A user may enter information in any one of the three input fields. For example, if the number 93 is entered in the serial number field along with a wild card to request all records that include the number 93, an output result may be displayed that is similar to what is shown in FIG. 9. The Inquiry GUI uses various tables within the DEIS 24 database, which are annotated on all of the exemplary GUIs of FIGS. 9 through 44. Thus, each of the tables that are affected, associated with, and/or queried by a GUI of the DEIS 24 is written beside the associated GUI. Further, Exhibit A, which is attached hereto, includes a chart that highlights and correlates each GUI or screen of the DEIS 24 with the associated tables of the database of the DEIS 24.

Figure 10:
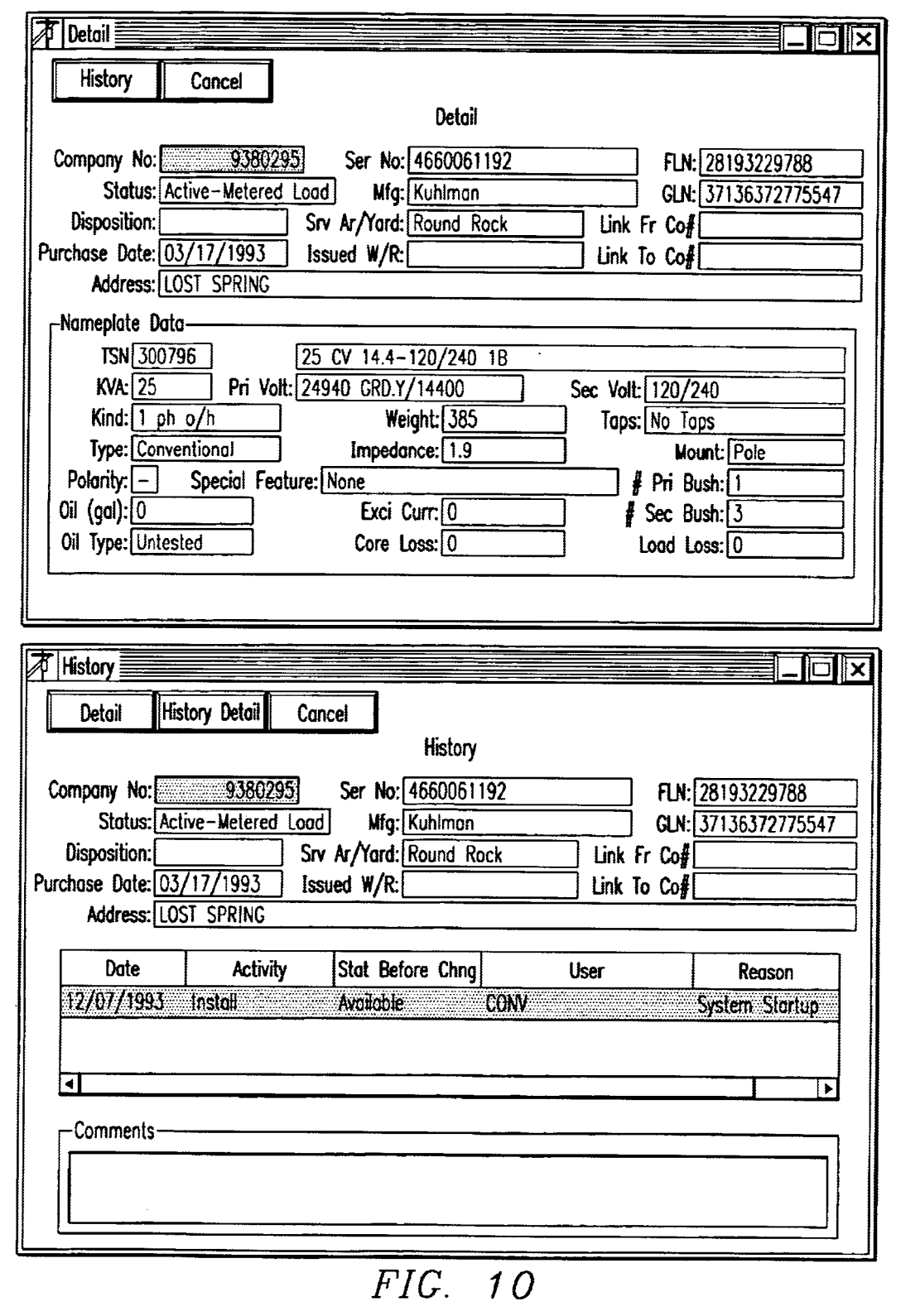

FIG. 10 illustrates an Detail GUI and a History GUI. The Detail GUI allows a user to input a company number, which is a unique identifier for a particular piece of equipment, such as a transformer, and presents all of the associated information that is shown in FIG. 10 as an output. This may include the serial number, the field location number, the status of the piece of equipment, the manufacturer of equipment, the grid location number, the purchase date, and any of a variety of other desired information.

The History GUI allows the user to enter a unique company number for a particular piece of equipment and receive historical information as an output. For example, the History GUI of FIG. 10 illustrates the case where the equipment that identified by the unique company number is shown to have been installed on Dec. 7, 1993 is available.

FIG. 11 illustrates an Installation History GUI and a Removal History GUI. The Installation History GUI allows a user to provide a company number of a particular piece of equipment and to receive detailed installation history as an output. Installation History may also be retrieved from the History GUI of FIG. 10 by selecting history detail on this GUI.

The Removal History GUI is similar to the Installation History GUI and provides more detailed history in the event that a particular piece of equipment had been removed from service in the past. FIGS. 12 through 14 all illustrate various specific history GUIs that operate similarly to the GUIs just described in FIG. 11. That is, the user may either enter a unique company number that identifies a particular piece of equipment directly into thses GUIs, or get to them from the History GUI of FIG. 10. For example, if a particular piece of equipment had a transfer history, a name plate maintenance history, a repair history, a test results history, or a reclassification history, as illustrated by the various GUIs of FIGS. 12 through 14, this information would be provided as a record or a line in the History GUI of FIG. 10. This line or record could be highlighted and then the desired history detail could be selected to display the desired history GUI of FIGS. 11 through 14, where the specific information would be displayed.

FIG. 14 illustrates a Reclassification History GUI and a On-dock Quantities by Location and TSN GUI. The Reclassification History GUI provides detailed history information for each piece of equipment or any desired piece of equipment relating to its classification or association with any particular business unit or business entity.

The On-Dock Quantities by Location and TSN GUI provides an input screen with input fields, such as the six input fields shown in FIG. 14, so that a user may enter information in one or more of these fields to develop a search query or criteria to receive any desired information. The term on-dock is synonymous as physically present at a particular location, regardless of its status.

FIG. 15 illustrates an On-Dock Quantities by Location and TSN Output GUI and an Outstanding Orders GUI. The On-Dock Quantities by Location and TSN Output GUI provides the graphical output results of the search or query that was performed and the On-Dock Quantities by Location and TSN GUI of FIG. 14.

The Outstanding Orders GUI provides an input screen so that a query or criteria can be set up to determine which orders have been placed but not yet filled. These are referred to as outstanding orders.

FIG. 16 illustrates an Outstanding Orders Output GUI and a TSNs Not Auto Re-Ordered by Yard GUI. The Outstanding Orders Report GUI is simply the graphical output result of the search that was performed by the criteria or query that was set up in the Outstanding Orders GUI of FIG. 15.

The TSNs Not Auto Re-Ordered by Yard GUI allows the user to choose a location, warehouse, service center, or the like to perform a query on the database to retrieve those pieces of equipment that have not been automatically re-ordered. Certain equipment, which are identified by unique stock numbers or TSN stock numbers, may be tagged so as not to be automatically re-ordered even in the event that such equipment is shipped and installed, and thus no longer available.

Figure 17:
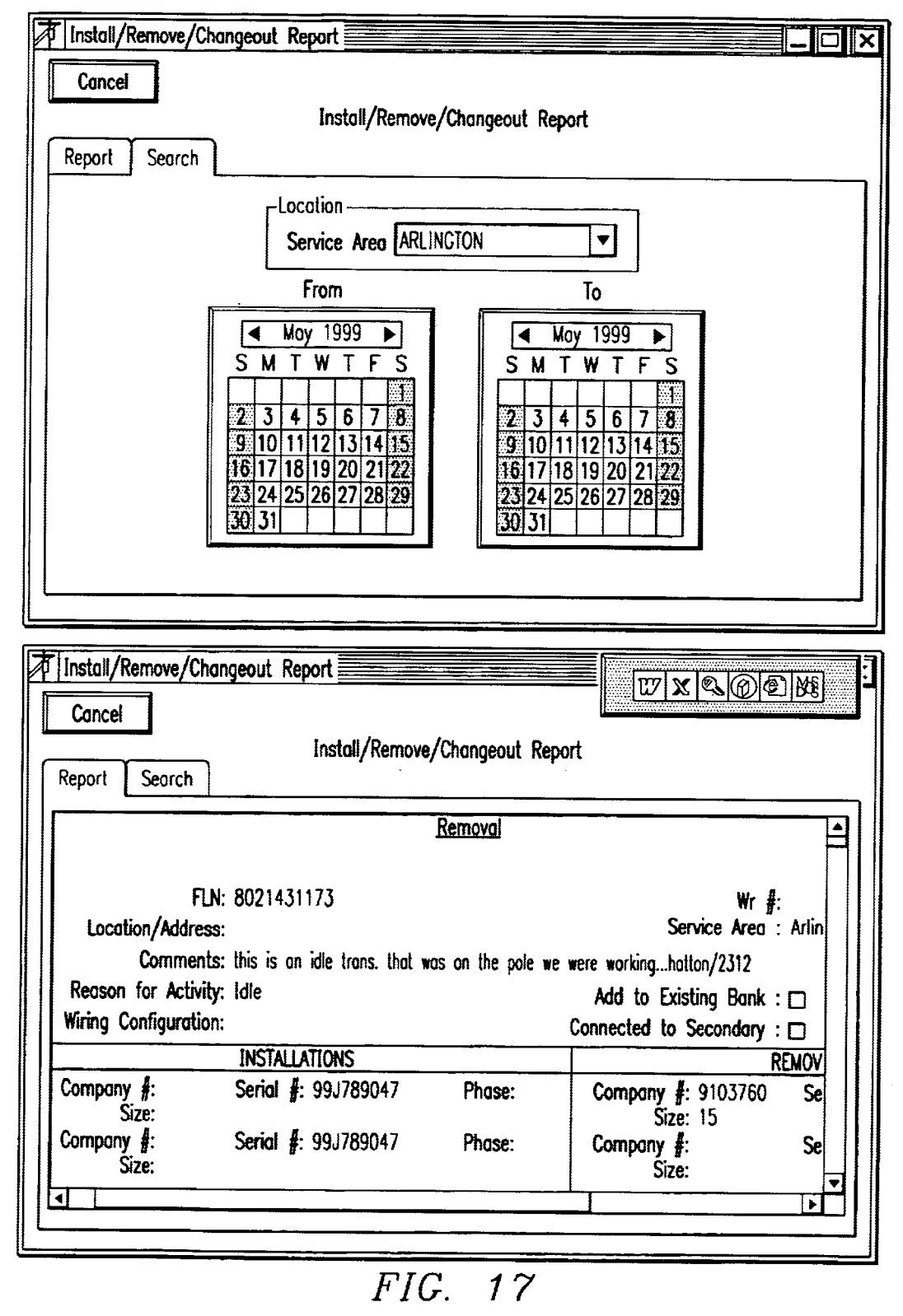

FIG. 17 illustrates an Install/Remove/Changeout Report GUI and an Associated Install/Remove/Changeout Report Output GUI. The Install/Remove Changeout Report GUI allows a user to input a particular location, such as a warehouse or service center, and a date range to generate a report. The Install/Remove/Changeout Report GUI illustrates such a report, which is provided as a graphical user interface and provides all the information for that location and for the date range as selected in the Install/Remove/ Changeout Report GUI. In effect, this provides an activity report for all of the equipment that was either installed, removed, or changed out during the particular date range that was selected.

FIGS. 18–21 provide an exemplary set of GUIs to achieve the installations/removals module. In general, this module allows for equipment installations and equipment removals to be properly tracked, monitored, and evaluated. The installations/removals module also provides the ability to interface with another system, such as a graphics system, to display or provide line drawings of an electrical distribution system. For example, INTERGRAPH provides graphical software to display one line drawings and the like of electrical distribution system, and to provide load flow or transformer loading engineering studies to track and monitor the loading and performance of the electrical distribution system.

Figure 18:
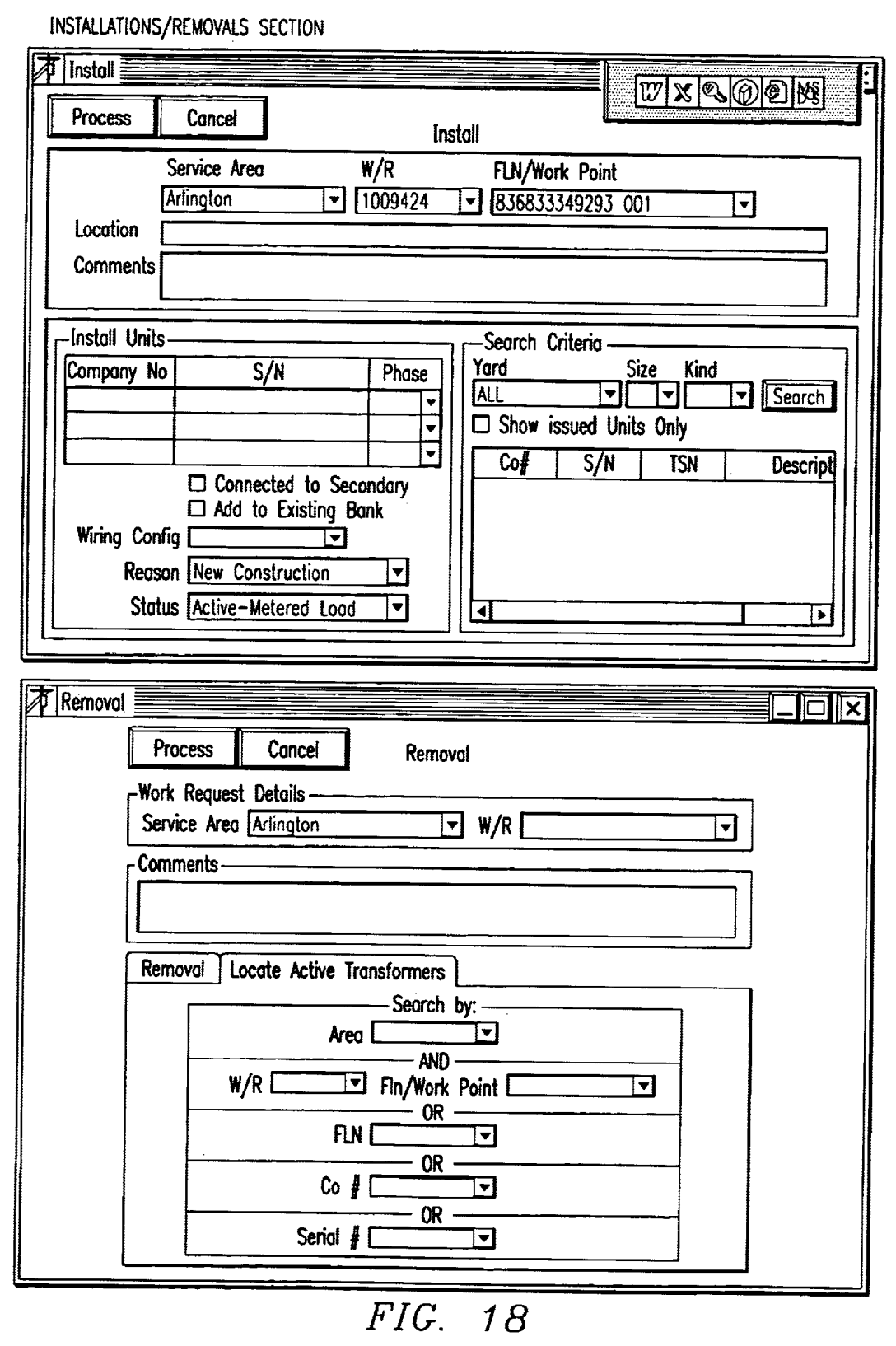

FIG. 18 illustrates an Install GUI and a Removal GUI. The Install GUI allows a user or installer, such as field personnel, to enter appropriate information after installing or while installing a particular piece of equipment. The Removal GUI allows a user to locate a particular piece of equipment, such as a distribution transformer, in the database that has been removed from service so that the information associated with this piece of equipment may be updated to include such things as where the removed equipment will be stored.

Figure 19:
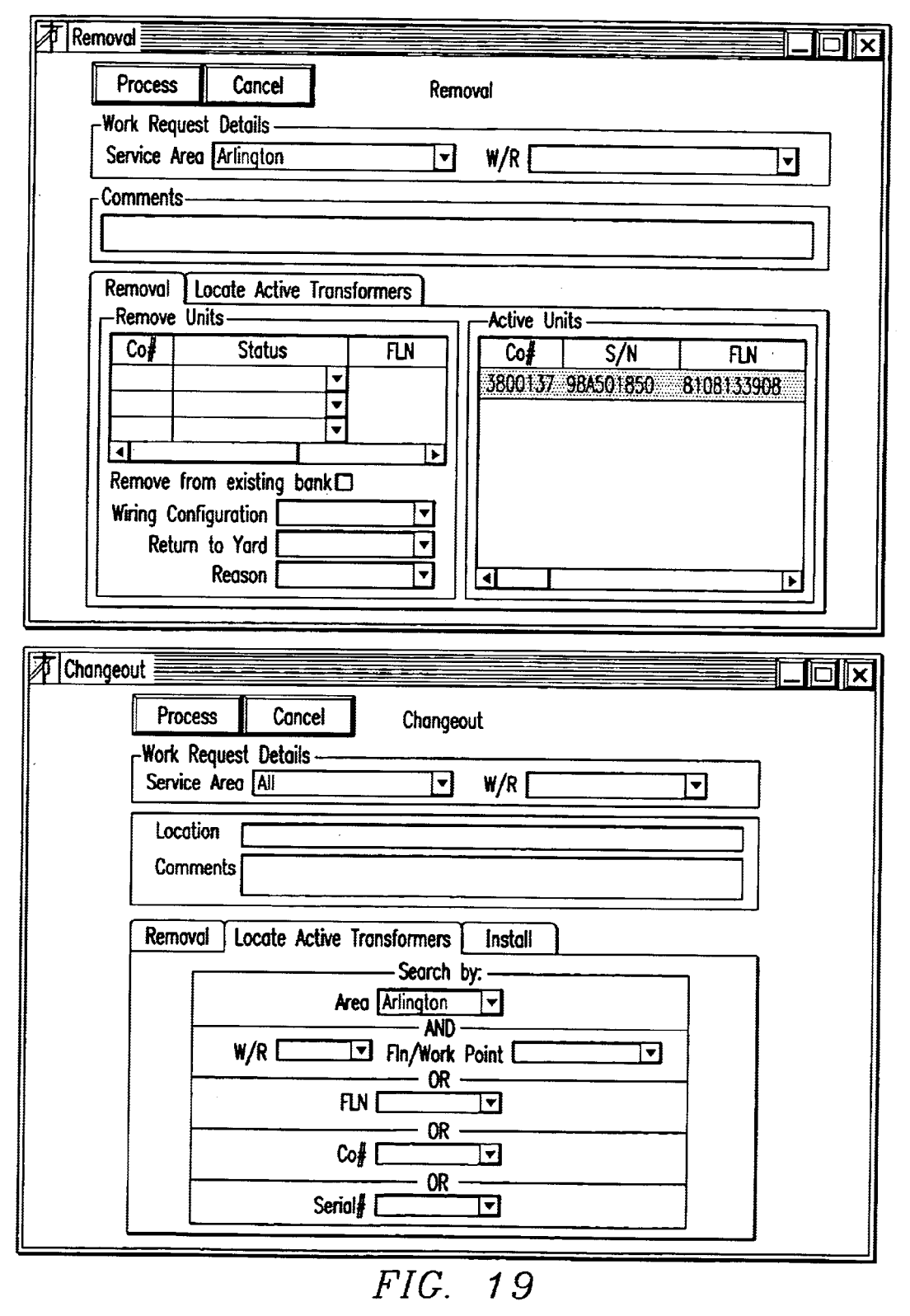

FIG. 19 illustrates a Removal Output GUI and a Changeout GUI. The Removal Output GUI is simply the output screen that assists a user with selecting the appropriate piece of equipment that is to be removed. For example, if a user does not know the exact unique identifier of a piece of equipment, which may be a company number, various wild cards may be used in the search performed at the Removal GUI of FIG. 18 to narrow the search results. The search results are then displayed in the Removal Output GUI so that a user may then select the exact piece of equipment that is being removed. The Changeout GUI is identical to the Removal GUI of FIG. 18 and is used instead of the Removal Output GUI whenever a piece of equipment is being exchanged or changed out, instead of being removed.

Figure 20:
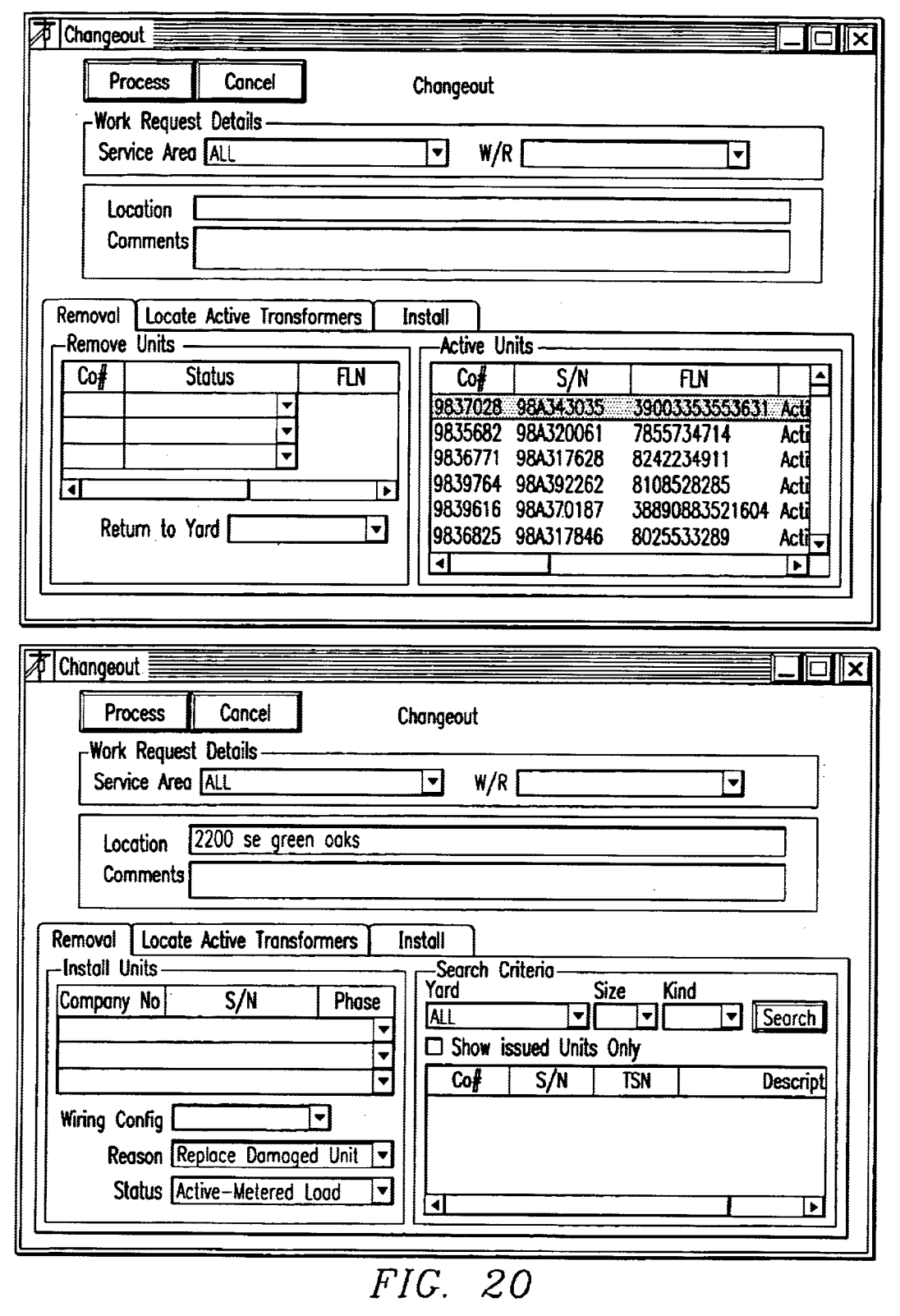

FIG. 20 illustrates a Changeout Output GUI that provides a removal sub-GUI and a Changeout GUI that provides an install sub-GUI. The Removal sub-GUI is similar to that which was just described above for selecting the appropriate piece of equipment to be removed in connection with the removal GUIs of FIG. 18 and FIG. 19. The Install sub-GUI is identical to the Install GUI as discussed above with respect to the Install GUI of FIG. 18. Thus, the Changeout GUIs of FIGS. 19 and 20 are simply combinations of the Install and Removal GUIs previously discussed.

FIG. 21 illustrates a Laptop Errors GUI and a DIS/DEIS Transformer Discrepancies GUI. These two GUIs provide error or discrepancy information in connection with two separate interfaces. The various GUIs described in FIGS. 18 through 20 may be provided on a laptop or portable computer that operates independent of the DEIS 24 as shown in FIG. 1 and in FIG. 47 below. In this manner, users or field personnel may more conveniently enter information while out in the field. This also improves accuracy and timeliness of the data because pertinent equipment information can simply be entered directly from the nameplate of the equipment without having to transfer such information to paper and then enter it into the DEIS 24. Once all the information has been entered in the various GUIs described in FIGS. 18 through 20, this information may be input into the DEIS System 24 through a batch process in such a manner that when the field personnel returns and connects directly to the DEIS 24, this information is then uploaded to the DEIS 24. A stored database procedure may be used to implement this functionality. In the event that there is erroneous data, the Laptop Errors GUI of FIG. 21 will illustrate such errors. In such a case, a user may then take appropriate action to correct the errors. This may be done by selecting the detail as shown on the Laptop Errors GUI so that a user may then correct the errors. This ensures that errors can be quickly and conveniently corrected. The DEIS 24 may perform any of a variety of checks to flag errors. This may include determining whether an entered value is a valid entry or checking to see if data for a particular piece of equipment has not been erroneously changed.

The DEIS/DEIS Transformer Discrepancies GUI provides an output report that highlights any discrepancies or data errors that were encountered during the process of providing information to the graphics system through the graphics interface. For example, if a particular transformer is marked as being located at a first Field Location Number or ("FLN") and the graphics system indicates that it should be located at a different or second field location number, a discrepancy record is generated and is shown as illustrated in FIG. 21. These may then be quickly and conveniently corrected, if needed.

FIGS. 22–27 illustrate various exemplary GUIs to achieve the functionality of the inventory module 18. Generally, the inventory module provides a mechanism to track, monitor, and evaluate equipment inventory. The inventory module 18 also allows or provides the capability to order inventory and update inventory information. Ordering inventory refers to the process of a satellite or non-central locations ordering equipment from a central hub or central location. For example, service centers in a electricity distribution company may order needed or desired equipment inventory from a central location or central warehouse.

FIG. 22 illustrates an Order Review GUI and an Order Review Output GUI. The Order Review GUI provides an input screen so that a query or search criteria can be established to search for orders that have already been entered into the DEIS 24. There are three ways in which orders may be entered into the DEIS 24. These include receipt of an order from an interface from an outside system, such as a job equipment estimation program, through an automatic inventory order function provided by the DEIS 24 using a stored procedure or the like, or through a direct order entry input entered by a user of the DEIS 24.

The Order Review Output GUI provides a list of records that meet the criteria of the query that was entered in the Order Review GUI above. From the Order Review Output GUI, the various orders may be evaluated and modified if desired.

Figure 23:
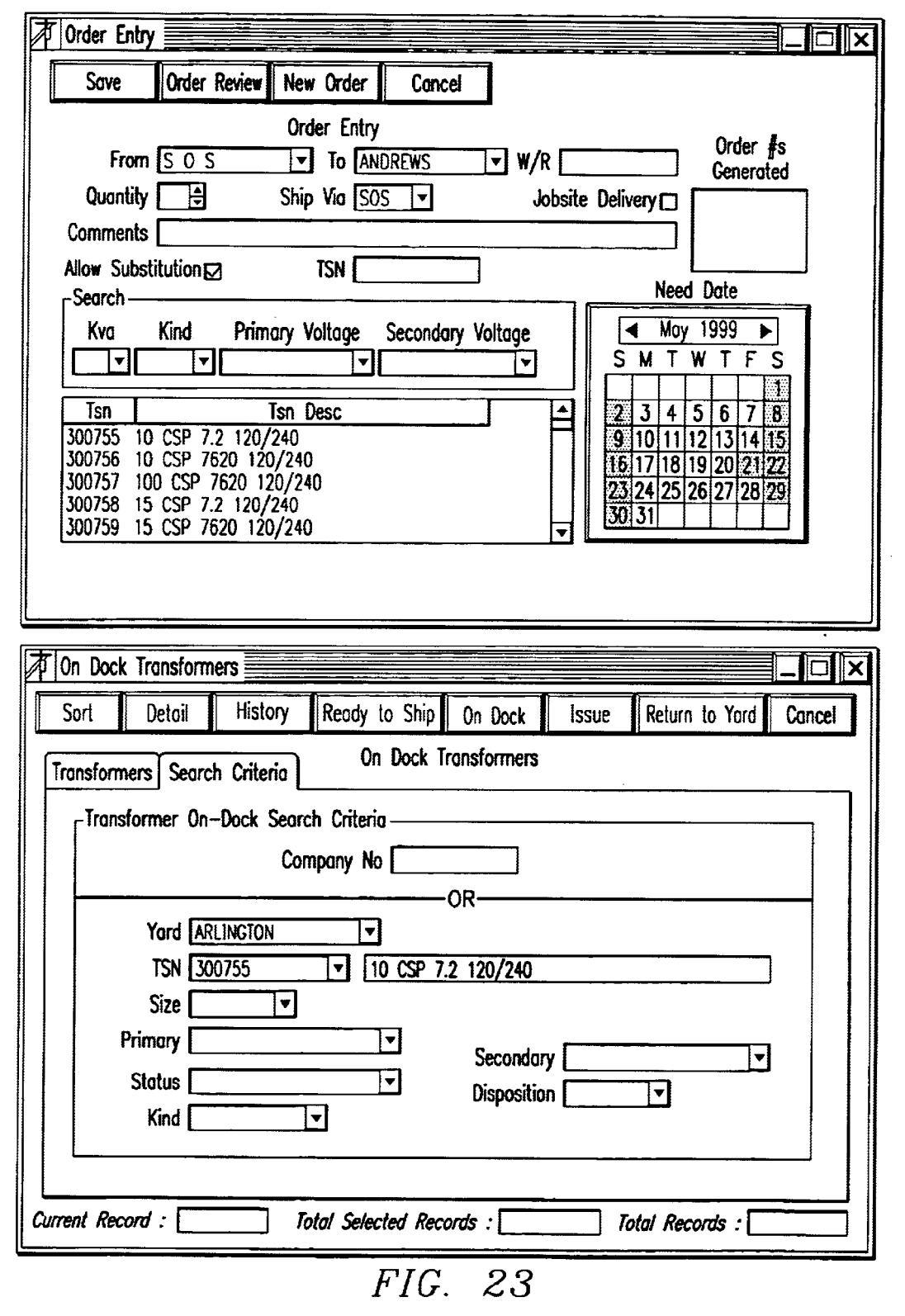

FIG. 23 illustrates an Order Entry GUI and an On Dock Transformers GUI. The Order Entry GUI is the interface in which a user of the DEIS 24 may enter an order into the system. In the Order Entry GUI as shown in FIG. 23, a user may enter the type of equipment that is desired. This may be done through the selection of a unique TSN or stock number and the destination where the equipment is to be delivered or is needed. The date that the equipment is needed is also entered through the Order Entry GUI.

The On Dock Transformers GUI provides an input screen to allow a user to develop a query or establish a search criteria to select information as to the physical presence or on-dock availability of certain equipment at certain warehouses, service centers, or locations.

Figure 24:
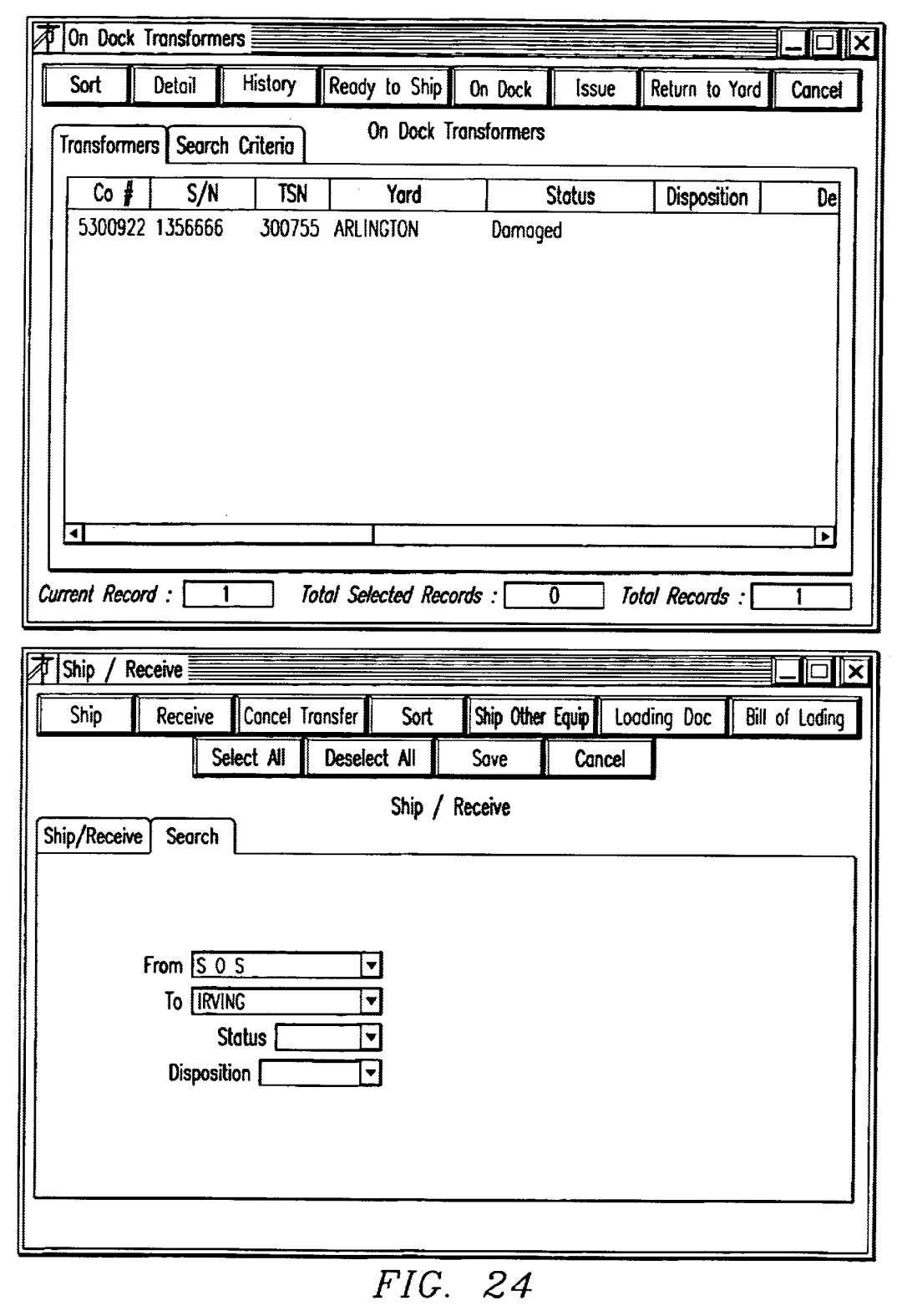

FIG. 24 illustrates an On-Dock Transformers Output GUI and a Ship/Receive GUI. The On-Dock Transformers Output GUI provides the records that meet the criteria of the search that was performed using the On-Dock Transformers GUI in FIG. 23. The On-Dock Transformers Output GUI also allows for any of the records that meet the search criteria to be modified or to have various status information changed. For example, a transformer or other piece of equipment that has been damaged and thus has a status that indicates the equipment has been damaged, the disposition of such equipment may be indicated by using the On-Dock Transformers Output GUI. This disposition, for example, may indicate that the transformer or equipment is being shipped to a particular location or service center for repair. The disposition may include any of a variety of statuses such as, for example in-transit and ready-to-ship. Once a particular piece of equipment has had its disposition changed to ready-to-ship, it may now be viewed as part of the Ship/Receive GUI. The Ship/Receive GUI allows for searches to be performed to determine the status of shipments between various locations, warehouses, or service centers. The from and to destinations may be indicated and the desired status and disposition may also be selected.

FIG. 25 illustrates a Ship/Receive Output GUI and a Nameplate Maintenance GUI. The Ship/Receive Output GUI provides an output report of the various records or data that meet the criteria that was selected on the Ship/Receive GUI of FIG. 24. The Nameplate Maintenance GUI allows a user to view and modify the information associated with a piece of equipment's nameplate.

Figure 26:
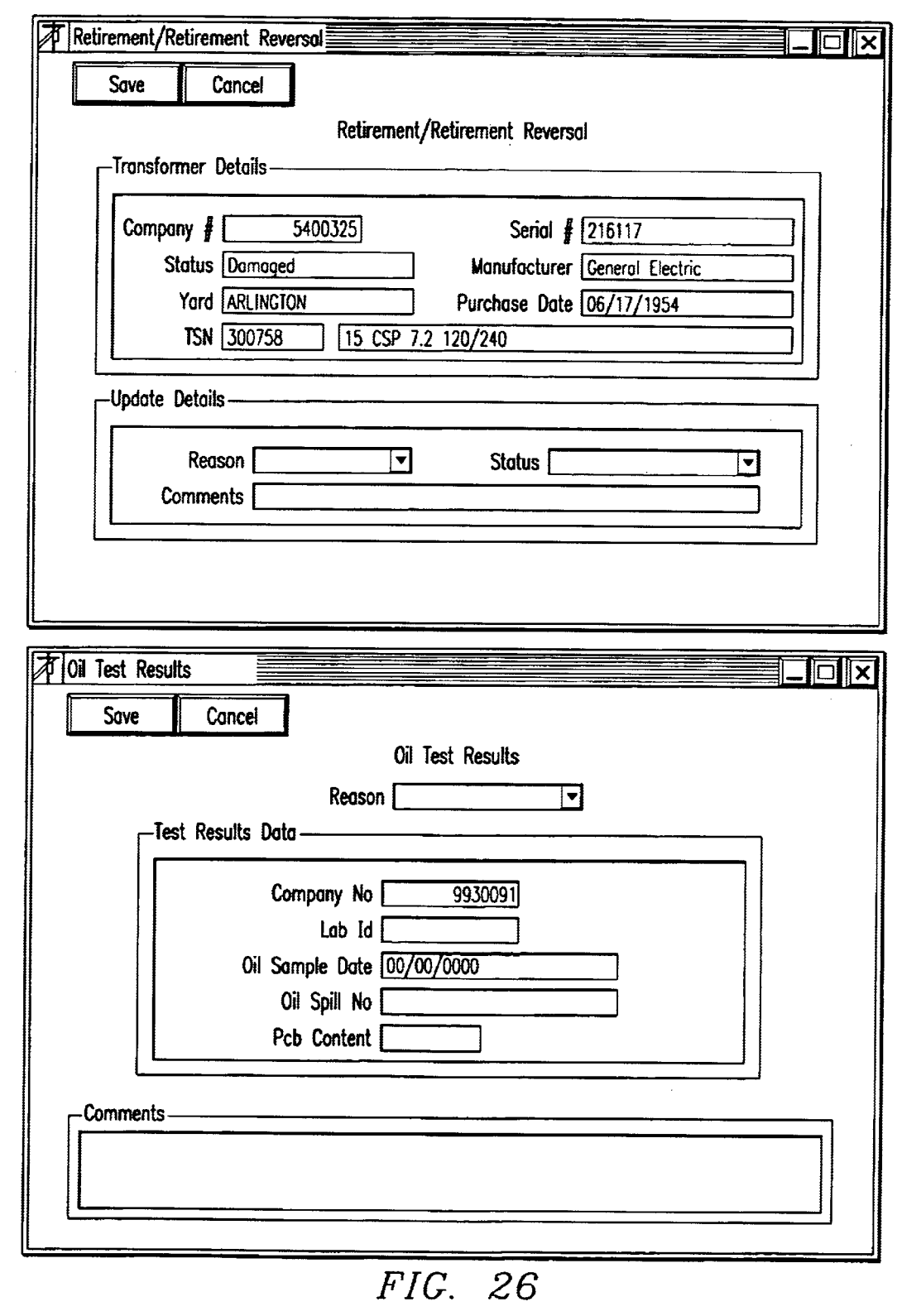

FIG. 26 illustrates a Retirement/Retirement Reversal GUI and an Oil Test Results GUI. The Retirement/Retirement Reversal GUI allows for equipment that was thought to have been previously lost or inadvertently retired to be redesignated as not retired. Further, the Retirement/Retirement Reversal GUI allows a piece of equipment to be retired. In this manner, the information associated with this piece of equipment will indicate that, the equipment has been retired. This information may prove useful in a regulated industry to provide information to a separate property accounting system so that equipment can be properly accounted for as being included in or not included in the rate base of a company.

The Oil Test Results GUI allows for oil tests or, in other embodiments, other environmental tests, to be entered and associated with a piece of equipment. For example, Logical Transformers often include oil as their insulators and this oil may be periodically tested for environmental contaminants. This information or these test results may be saved and stored with each transformer. This historical information may prove very useful in efficiently and economically complying with any of a variety of local, state, and federal environmental regulations.

FIG. 27 illustrates a Crew GUI and a Crew Yard GUI. The Crew GUI is simply a table of information of the various crew members in which a transformer may be issued or a list of equipment may be issued. The Crew Yard GUI associates each crew name provided in the Crew GUI with a particular location, warehouse, or service center.

FIGS. 28 through 32 provide an exemplary set of Graphical User Interfaces (GUIs) that may be used to provide inventory module functionality that will, in a preferred embodiment, be accessible only by certain DEIS users, such as DEIS users at the central inventory location 202 illustrated in FIG. 11. The central inventory location 202 may be thought of as central hub or central location that may provide storage, maintenance, and shipping services for the equipment so that other warehouses or locations, normally satellite locations, may receive and transport equipment from and to the central location. The various functions that may be performed at such a central hub may include adding new equipment, filling purchase orders, testing equipment, changing the status information of equipment, adding found equipment, repairing equipment, reclassifying equipment, and any number of other activities that may be performed at a central hub or central location.

FIG. 28 illustrates an Add New Transformers GUI and a Fill Orders GUI. The Add New Transformers GUI allows for the receipt of new equipment, such as transformers in this case, to be added to the database of the DEIS 24. When a new transformer-is received, a separate procurement and accounts payable system that may track such items as purchase orders may be notified that the transformer or other equipment has been received so that the appropriate vendor or manufacturer may be paid. Similarly, the receipt of a new transformer in a regulated industry, such as a regulated electric utility, may require that the received equipment be added to the rate base or capitalized. In one embodiment, a separate property accounting system may receive information that the additional equipment or property has been received and thus should be added to the rate base.

The Fill Orders GUI allows a central hub or location, such as a central inventory location, to meet or fill the orders or requests from the various other locations or service centers that are requesting equipment from the central hub or central inventory location. For example, the Arlington Service Center may be selected in the location field and all orders requested for the present time period may be viewed and a particular piece of equipment may be designated as the piece of equipment that will be used to fill the order. In one embodiment, the status of the particular piece of equipment is changed to ready-to-ship, indicating that the piece of equipment has been designated to meet a particular order and is designated for another location.

Figure 29:
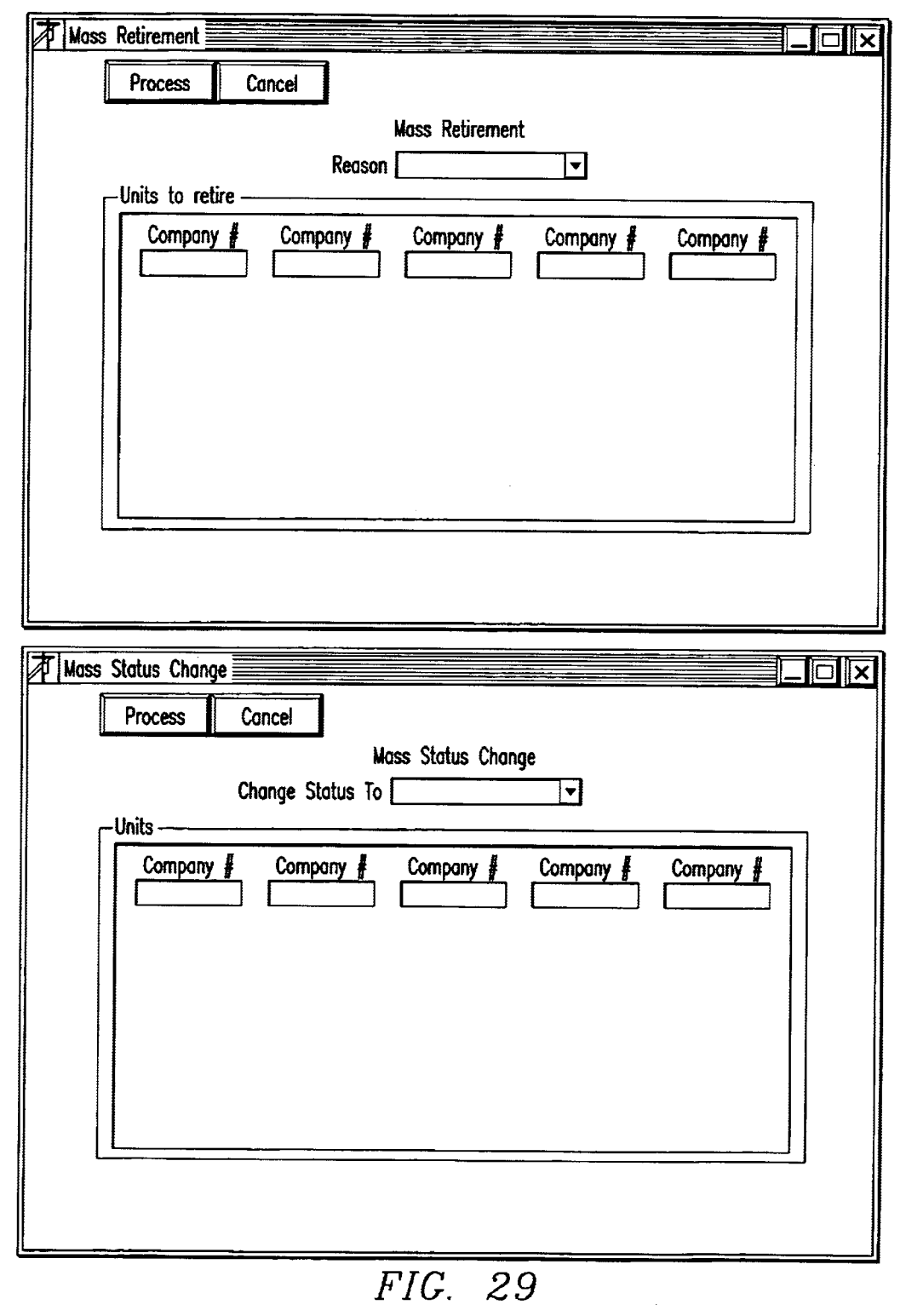

FIG. 29 includes a Mass Retirement GUI and a Mass Status Change GUI. These two GUIs simply provide a convenient means in which to change the status of a large number of pieces of equipment at one time. The Mass Retirement GUI allows multiple pieces of equipment to be retired at once, while the Mass Status Change GUI allows multiple pieces of equipment to have their status changed at once.

Figure 30:
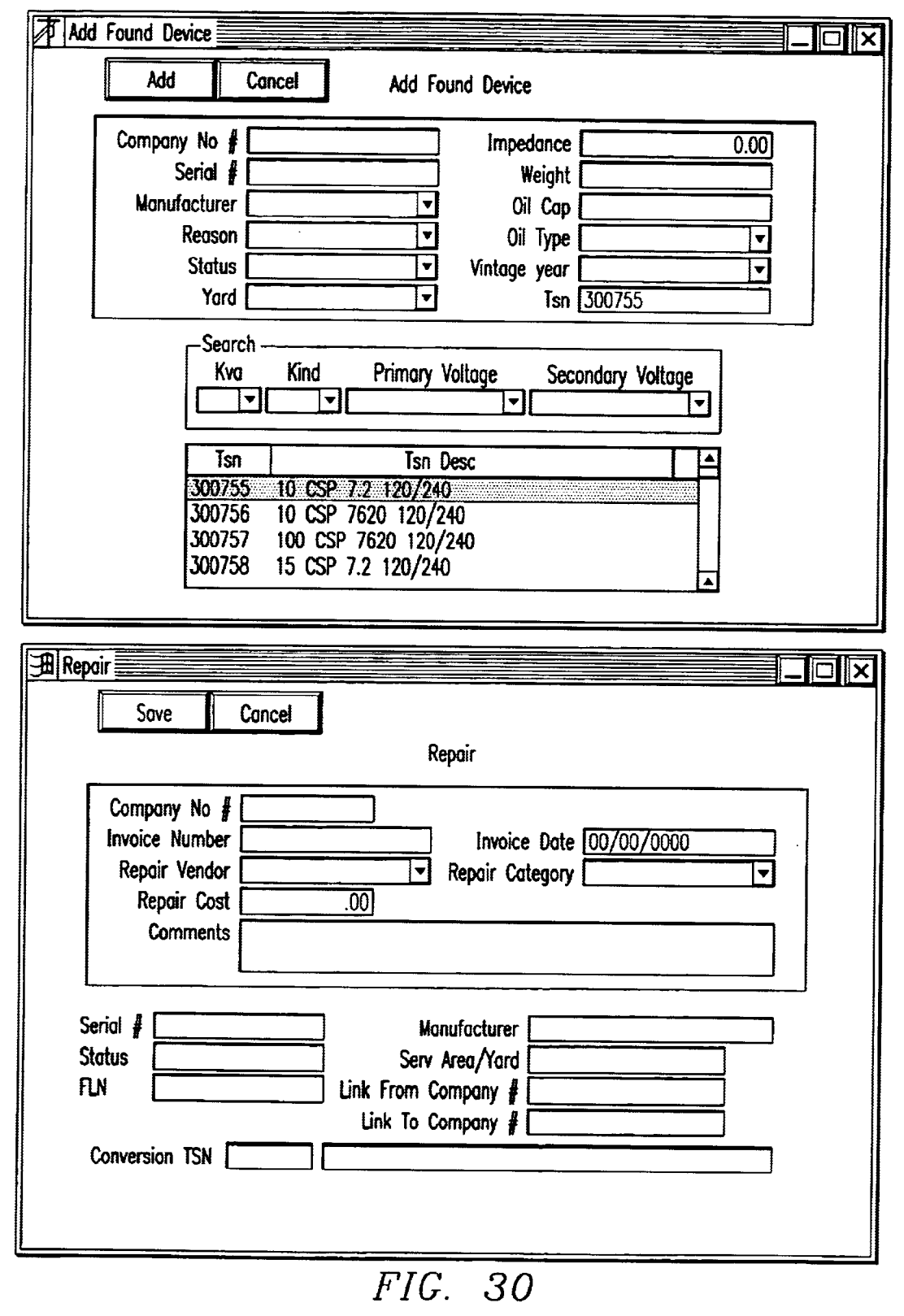

FIG. 30 illustrates an Add Found Device GUI and a Repair GUI. The Add Found Device GUI allows a piece of equipment that, for whatever reason, is not entered into the database of the DEIS 24 and has not been recorded. In this manner, the particular piece of equipment is now provided as a record in the database of the DEIS 24 so that it may be tracked, monitored, and evaluated like all of the other pieces of equipment. The Repair GUI allows for information relating to repair work that was performed at the central location or under the direction of the central location to be entered and retained with the piece of equipment as historical data. In this manner, over a period of years, historical repair data may be retained such that a complete history of a transformer's repairs may be gathered and maintained and easily accessed through the DEIS 24.

FIG. 31 illustrates a Company Number Change GUI and a Reclassification GUI. The Company Number Change GUI in the exemplary embodiment illustrated by the DEIS 24, provides a mechanism to change the company number ID. The company number ID, in the exemplary embodiment illustrated, provides the unique identifier for each piece of equipment. The Reclassification GUI provides a mechanism to reclassify the ownership of a particular piece of equipment from one business entity to another. For example, in a regulated environment, certain equipment may be counted as part of a rate base while equipment owned by other entities may not. In the event that equipment, such as transformers, is transferred from one entity to the other, the rate base would need to reflect the same accordingly. Anytime that a reclassification occurs, information may be sent to an outside system via an interface to indicate such a reclassification. In one embodiment, the property accounting system, which tracks the equipment that should be included as part of the rate base in a regulated entity, is notified of the reclassification change and is updated accordingly.

FIG. 32 illustrates the last GUI of the inventory module that concerns the central inventory location in the exemplary embodiment illustrated herein. FIG. 32 illustrates a TSN Mfg Template GUI. The TSN Mfg Template is simply a table that lists all of the available TSN numbers. A TSN number may simply be thought of as a stock number or as a SKU that uniquely identifies a particular class and type of product or equipment.

FIGS. 32–36 provide exemplary GUIs to carry out the various functions performed by the transportation module 20. The transportation module provides such functions as assistance with managing transportation loading, transportation routing, driver planning, generating loading documents that assist the driver and the receiving party with what is being transported, generating bills of lading to comply with Department of Transportation regulations which, among other things, provide certain weight limits and weight restrictions.

FIG. 32 illustrates a Load Detail GUI, which is the first GUI in the transportation module 20. The Load Detail GUI receives route information and requests for either all loads currently planned or in transit or specific load numbers that are planned or are in transit and provides a report of various orders that have both been assigned to a load and those that have not yet been assigned to a load.

FIG. 33 illustrates a Create/Update Loads GUI and a Driver GUI. The Create/Update Loads GUI allows a user to create new truck loads and to update or modify previously created loads. The Create/Update Loads GUI also allows for the status as to whether the load is in transit or planned to be changed. Reports may also be generated from the Create/Update Loads GUI so that bills of lading and loading reports may be generated and physical printouts may be provided to the truck drivers. The Driver GUI simply lists all available drivers and their default truck number.

Figure 35:
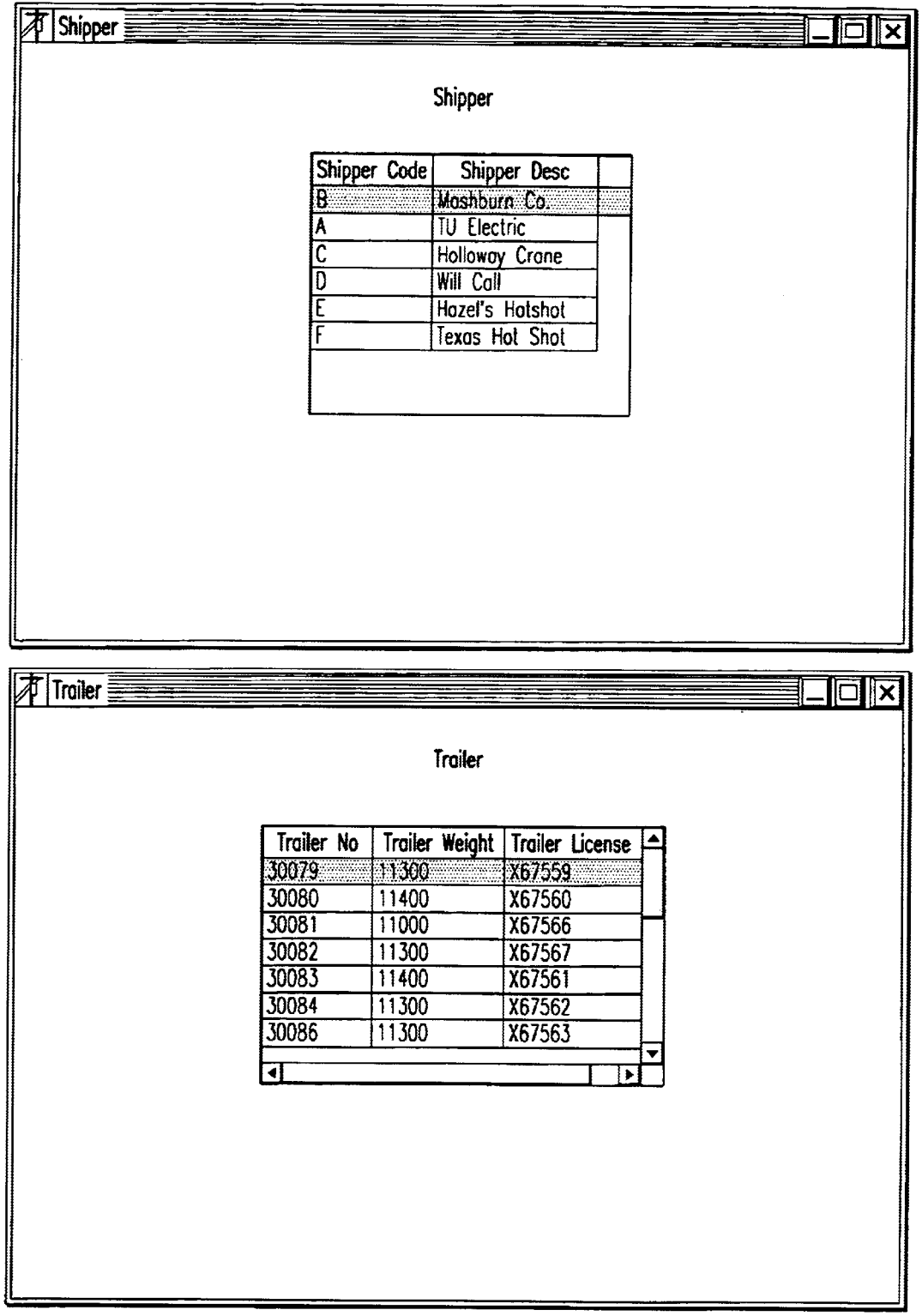
Figure 37:
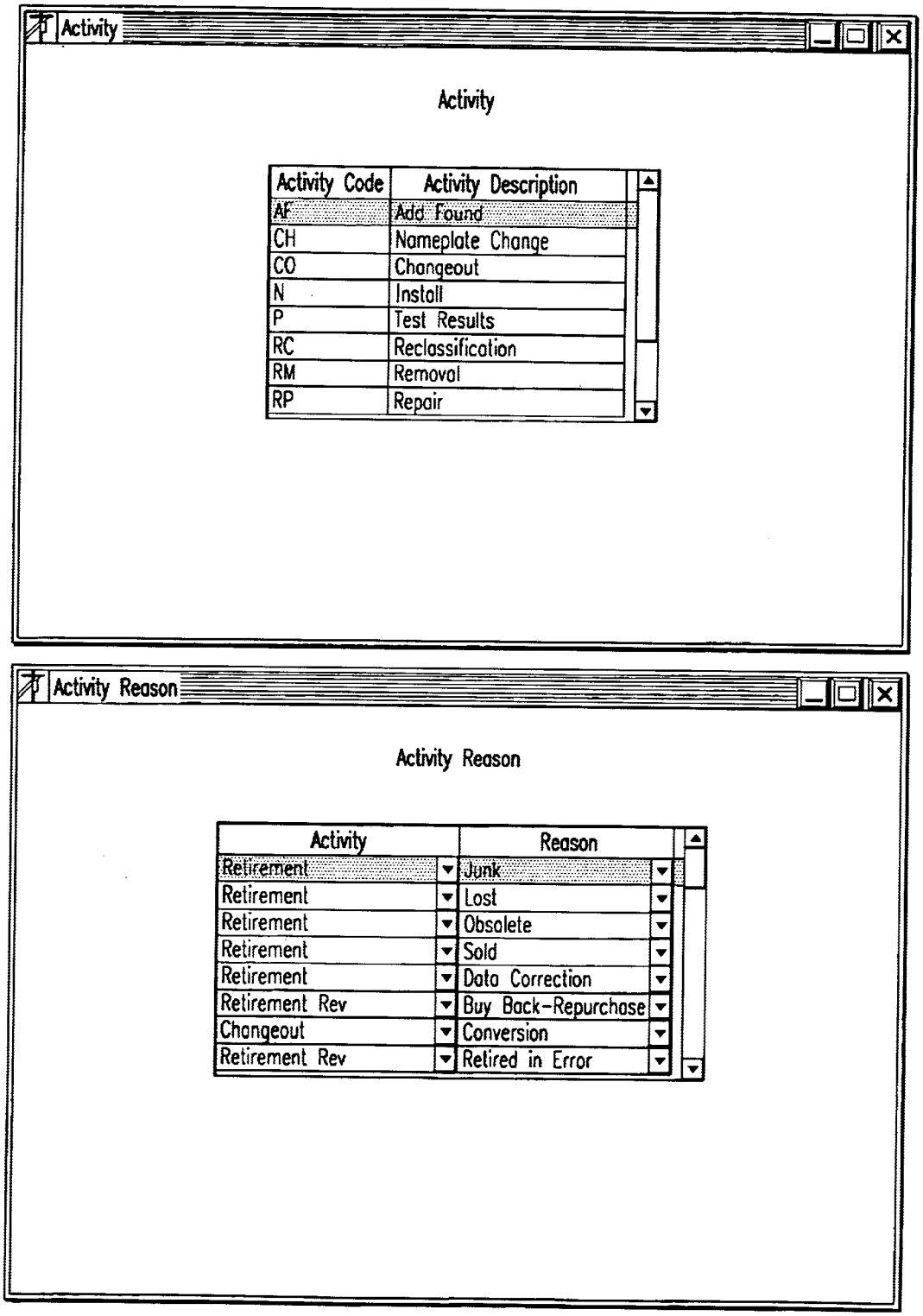
Figure 38:
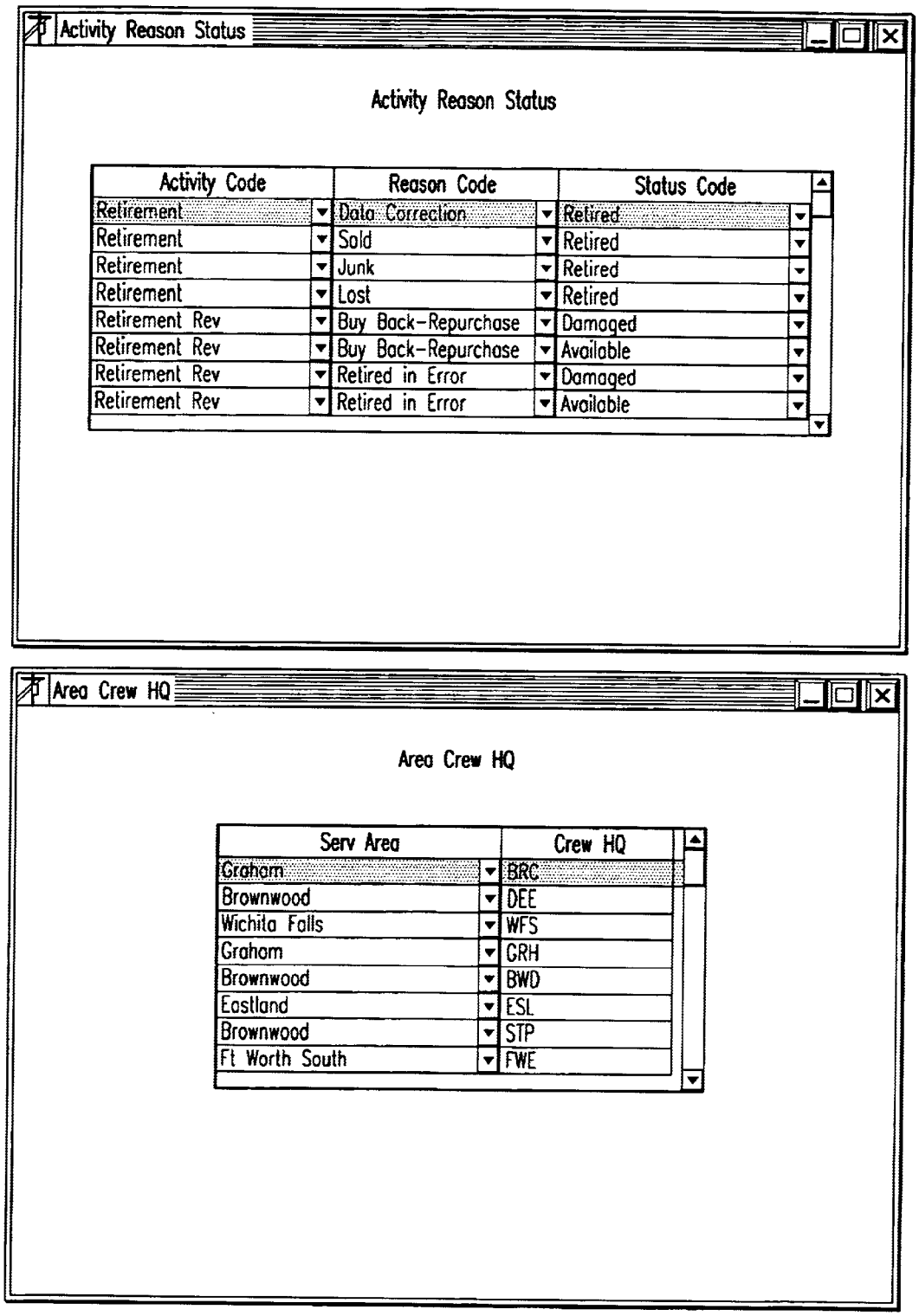
Figure 40:
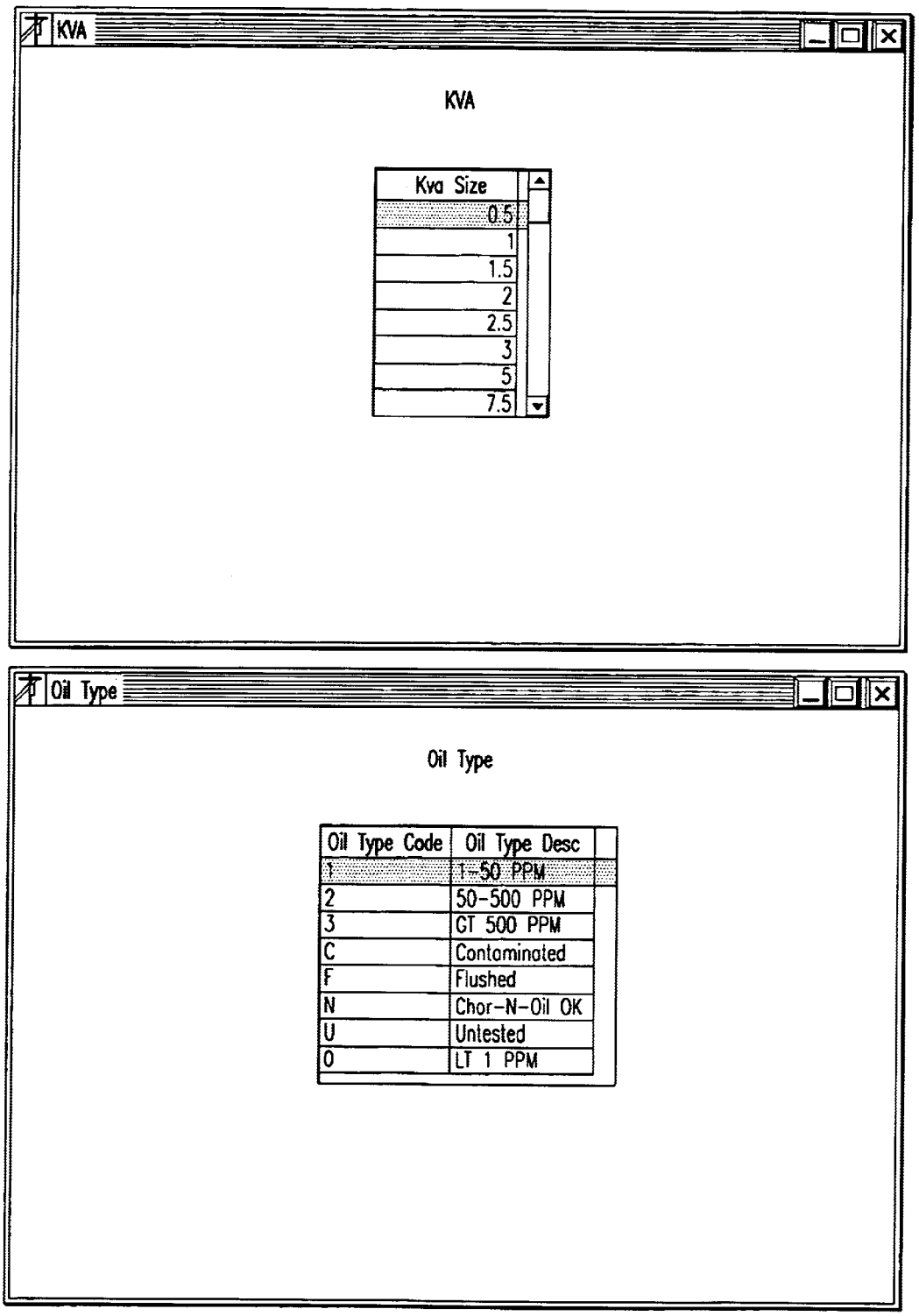
Figure 41:
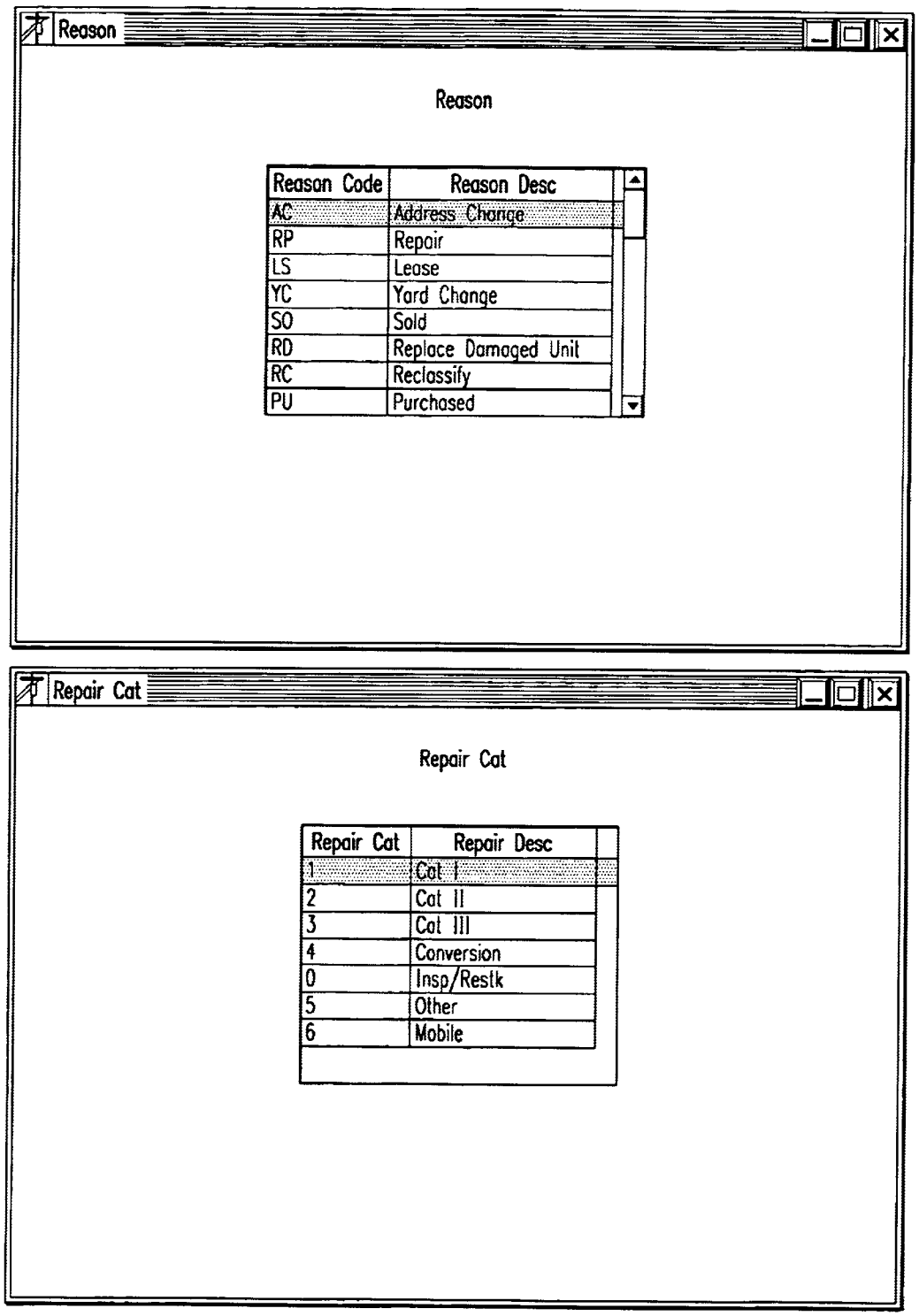
Figure 43:
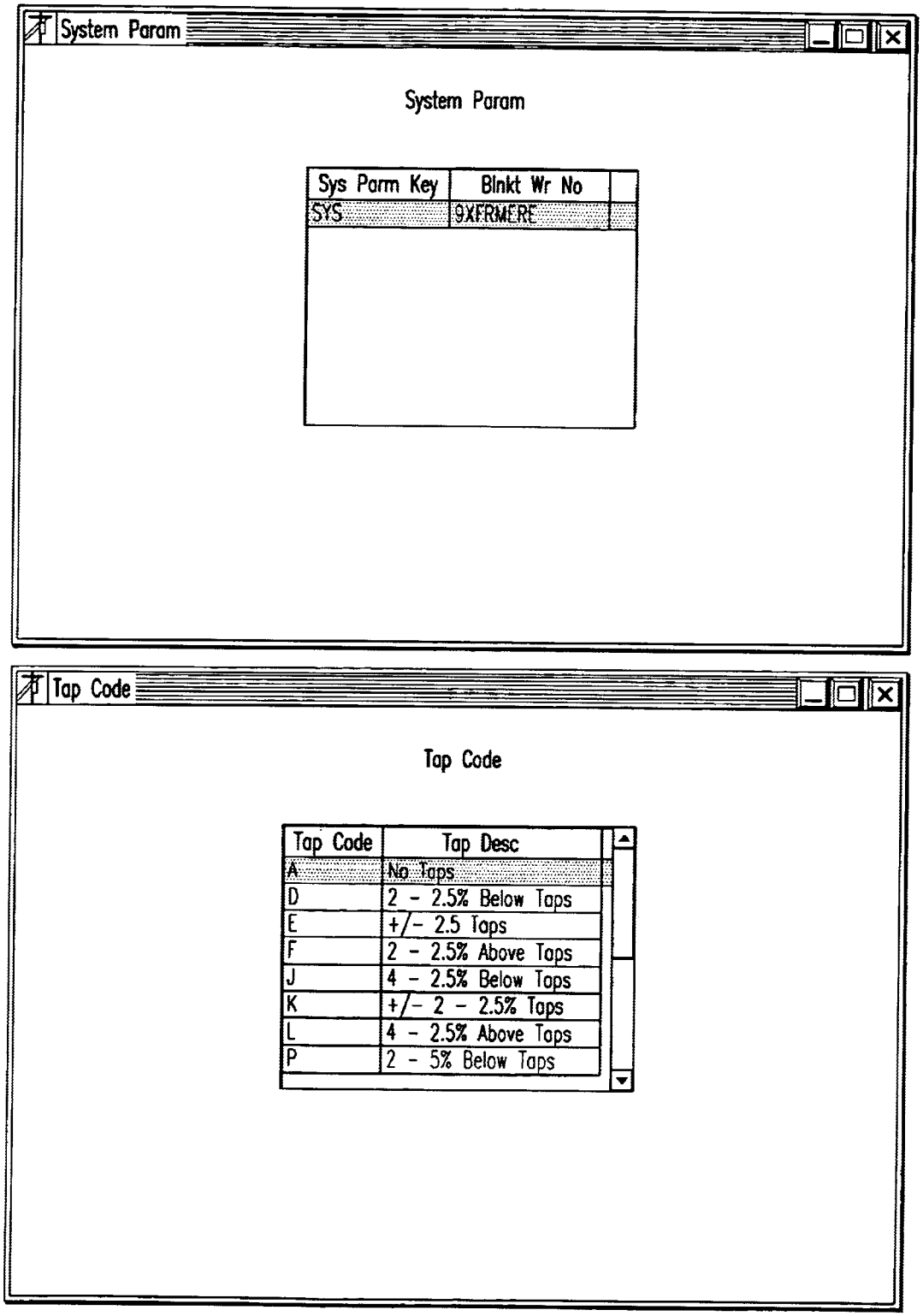
Figure 44:
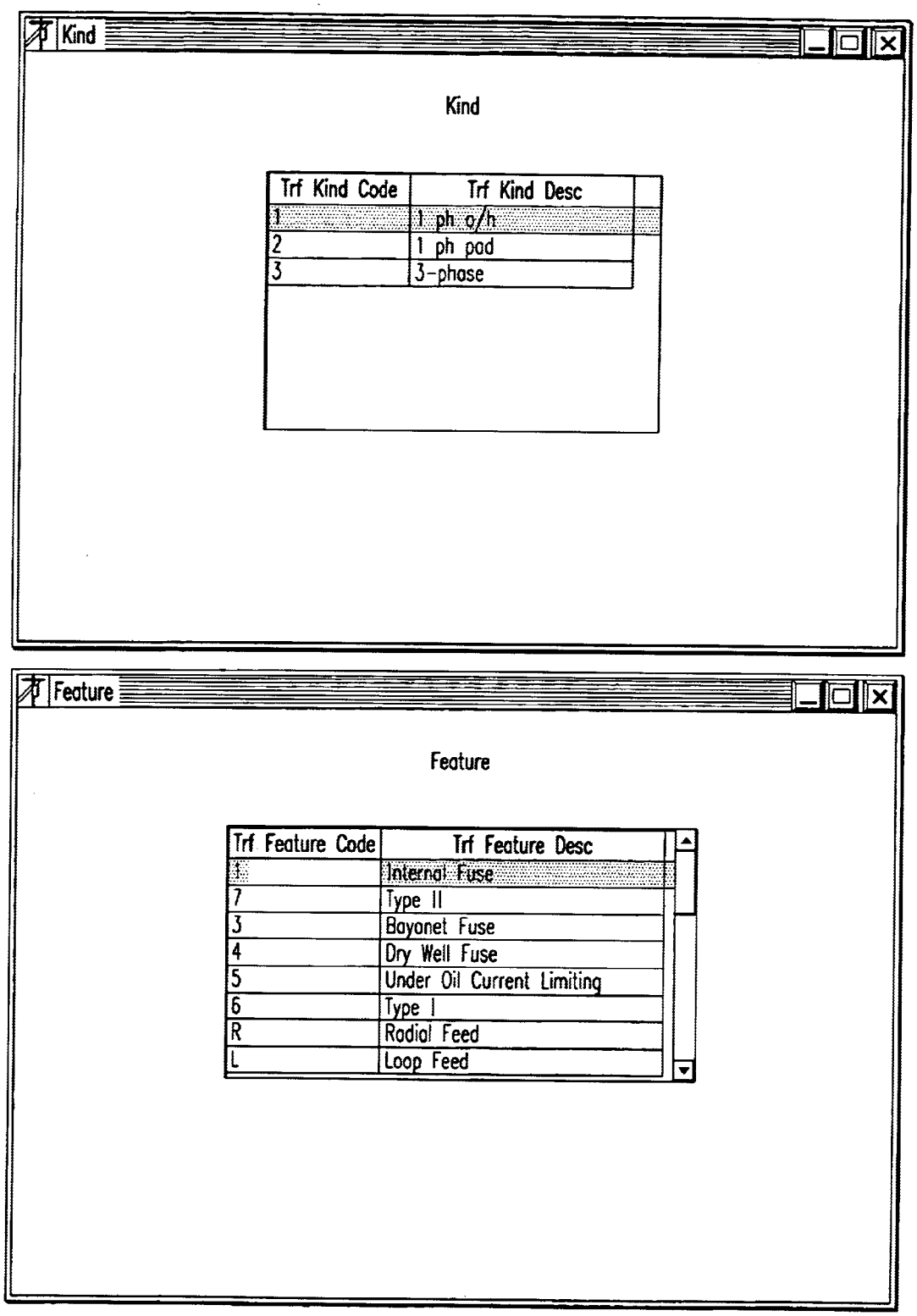
Figure 45:
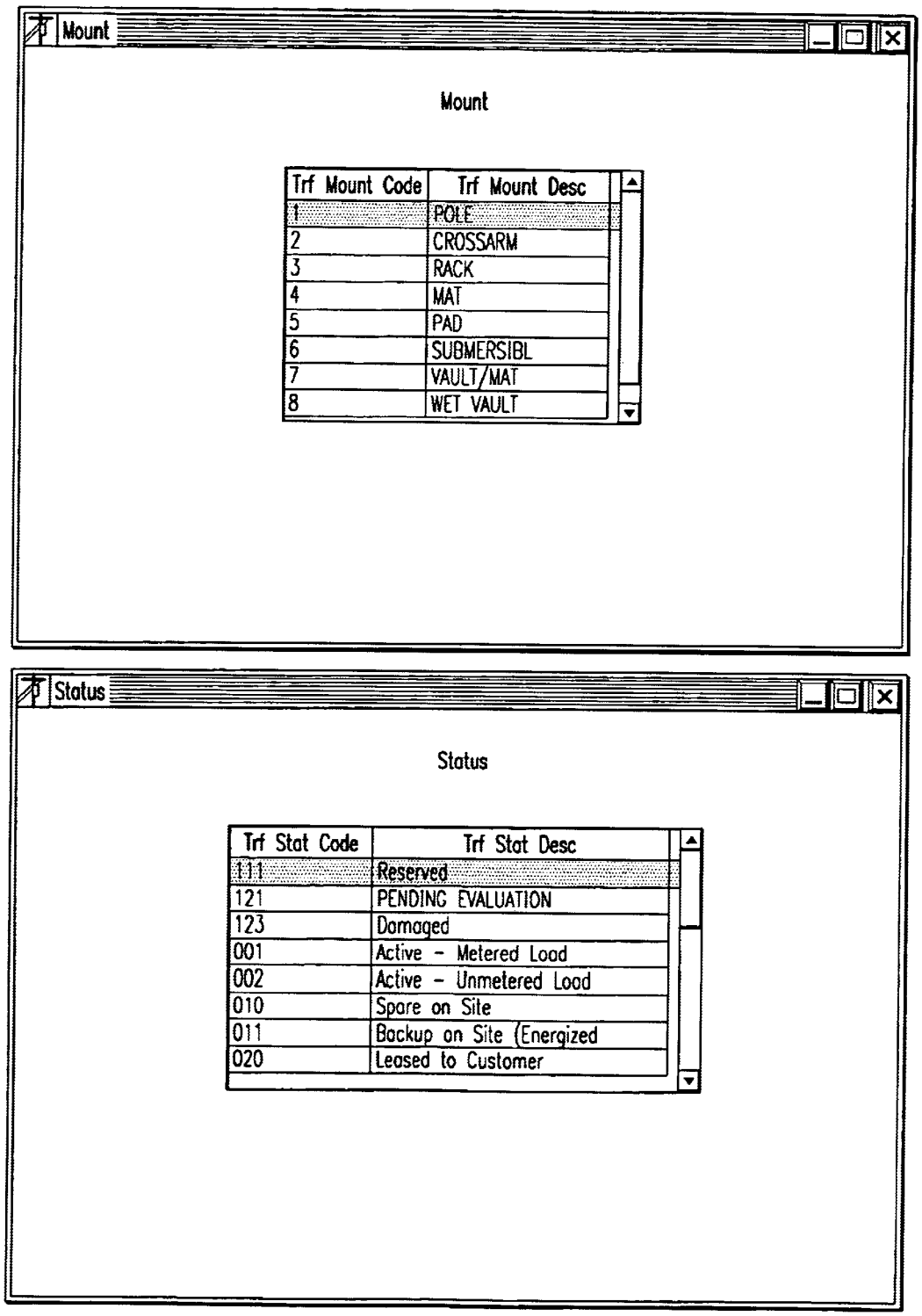
Figure 46:
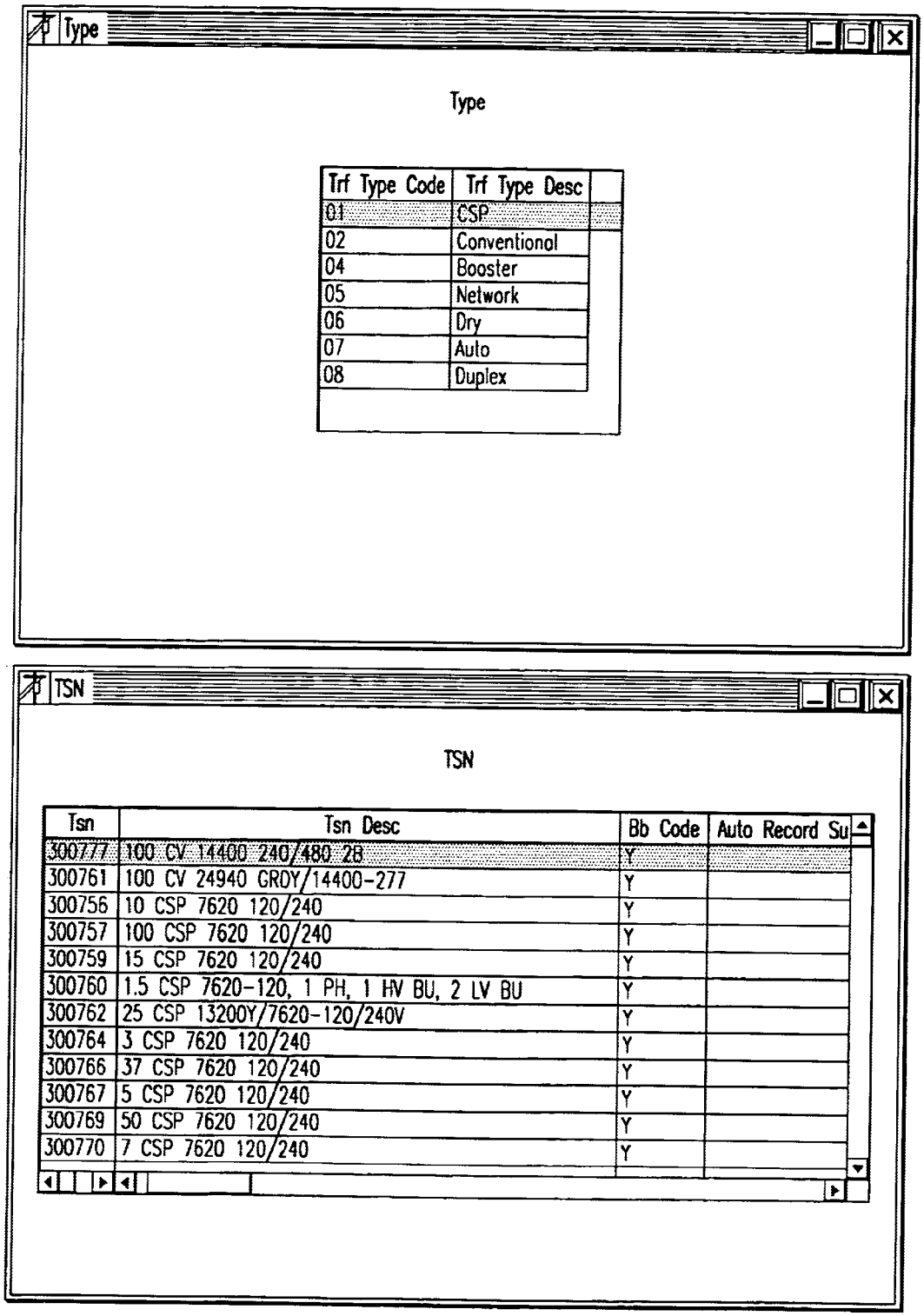
Figure 48:
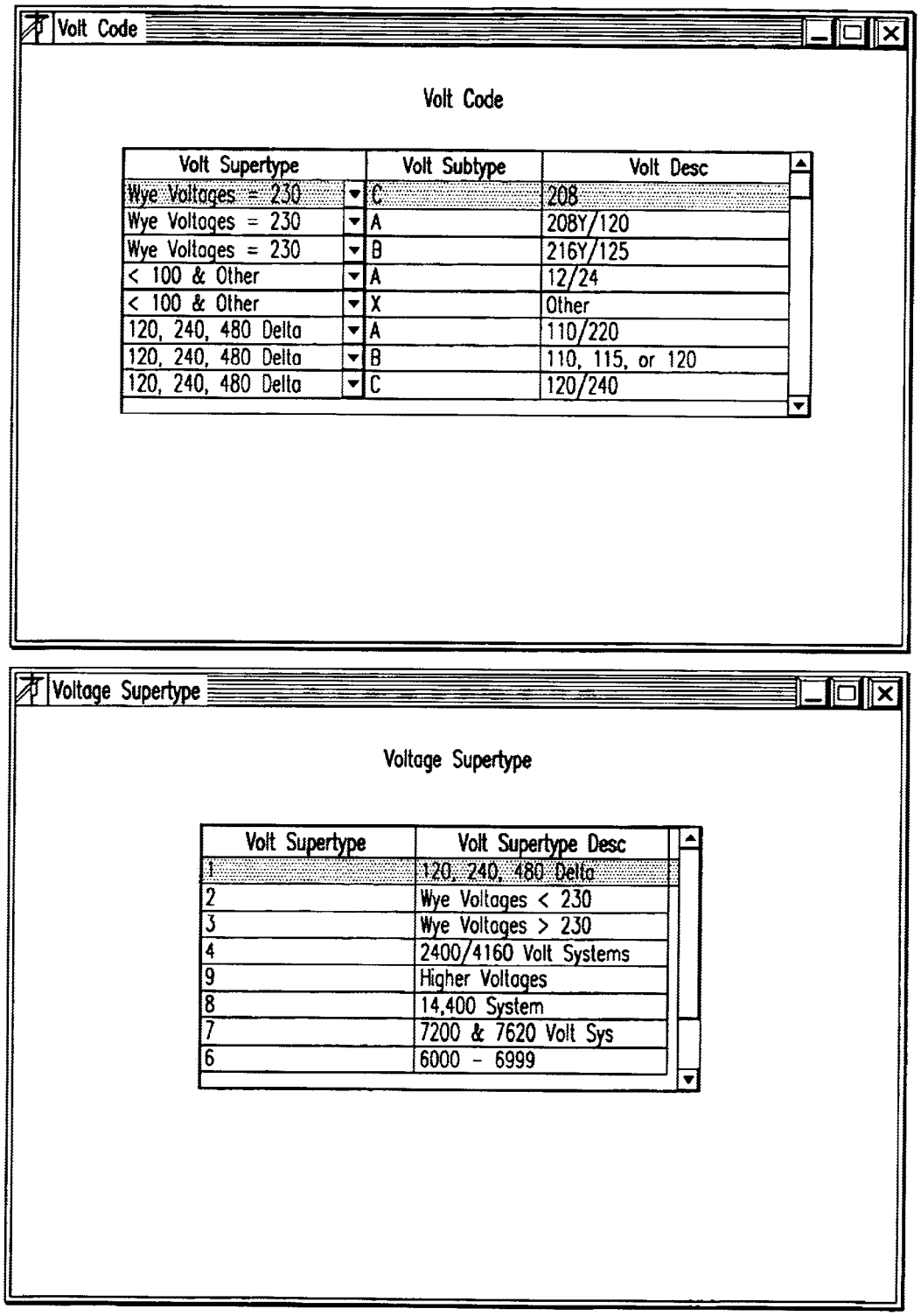
Figure 49:
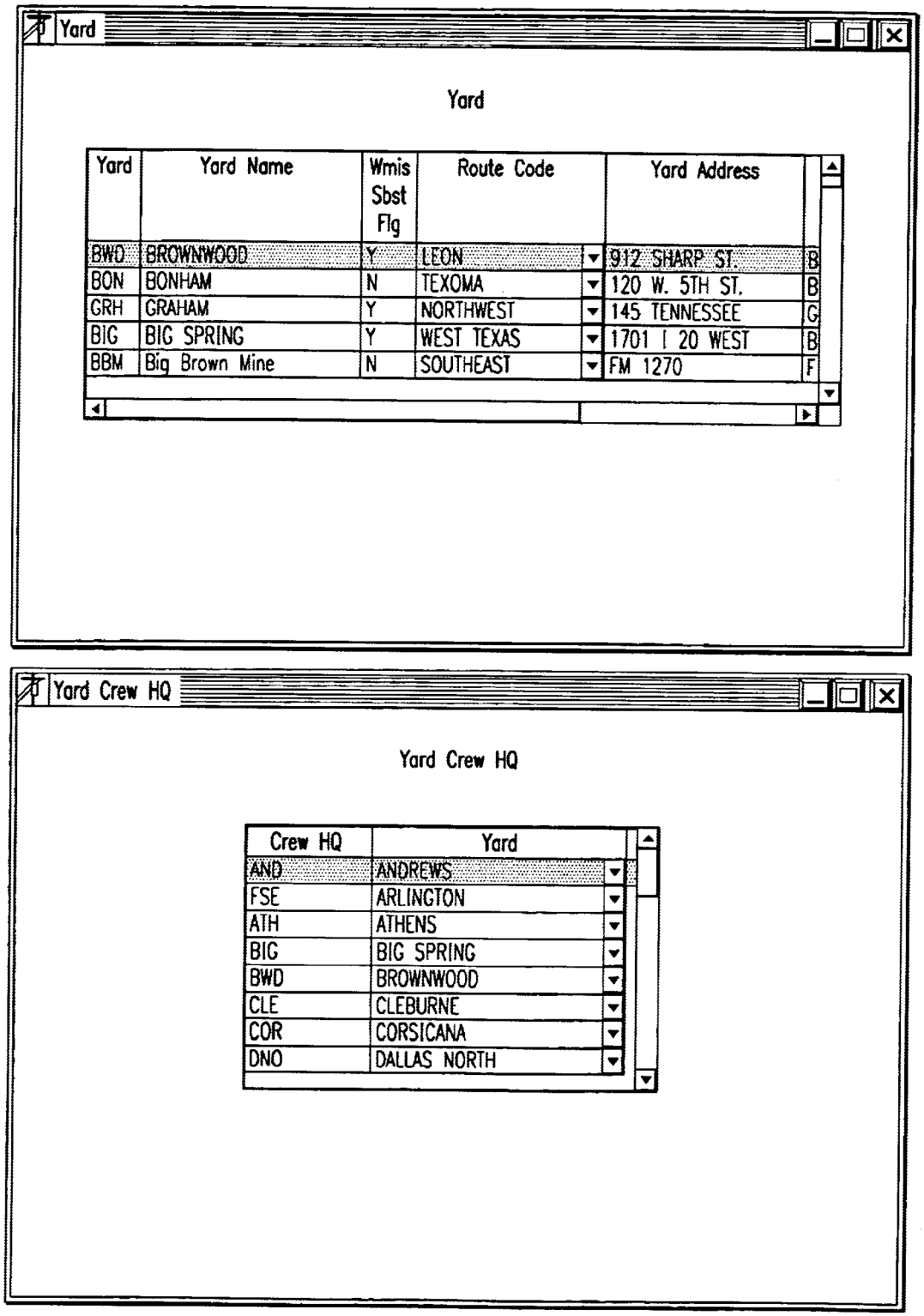
Figure 50:
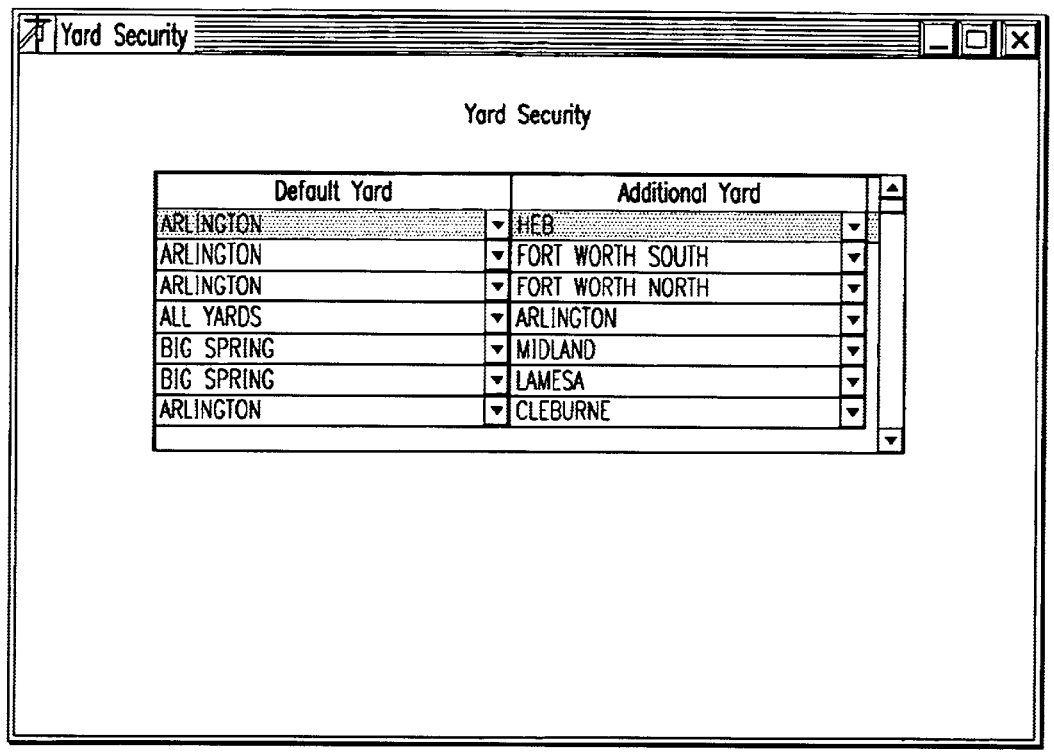

FIGS. 34–36 provide the final GUIs for the transportation module 20 and provide access to various tables so that information may be viewed and certain information may be modified. These GUIs provide access to such information as stock numbers or TSN numbers of other equipment, route information, which includes cut off day and cut off hour information, shipper information, trailer information, including trailer weight capacities and other identifying information, and truck information.

FIGS. 36–50 include various exemplary tables that are used to carry out the functions of the table maintenance module 14. In general, these various tables provide user access to various tables of the database of DEIS 24 that include information that a user has the authority to modify. This information includes such information, for example, as equipment manufacturer information, activity descriptions, status codes based on activity and activity reason selections, crew information, security information, yard, warehouse, or location security, and equipment specifications such as KVA ratings and oil type. The tables also contain such information as reason codes, repair information, service area descriptions, transformer tap code information, transformer phase information, stock number or TSN information, user security, and virtually any other information that is desired.

Thus, it is apparent that there has been provided, in accordance with the present invention, an equipment information system and method that allows for equipment inventory to be tracked, monitored, and evaluated more efficiently and effectively, and that satisfies one or more of the advantages set forth above. Although the preferred embodiment has been described in detail, it should be understood that various changes, substitutions, and alterations can be made herein without departing from the scope of the present invention, even if all of the advantages identified above are not present. For example, the system may be implemented using a different software architecture and the various functions and modules may be combined and rearranged in any number of ways. The system of the present invention may be implemented using a client/server configuration as described herein, or using a central processing configuration or less distributed configuration. Also, the techniques, systems and sub-systems described and illustrated in the preferred embodiment as discrete or separate programs and processes may be combined without departing from the scope of the present invention. Other examples of changes, substitutions, and alterations are readily ascertainable by one skilled in the art and could be made without departing from the spirit and scope of the present invention.

What is claimed is:

1. An equipment information system comprising:
   an equipment database;
   a database manager operable to access and interrogate the equipment database;
   an inquiry module operable to query the equipment database through an interface;
   an inventory module operable to store and change data in the equipment database through an interface, and to allocate an order;
   a transportation module operable to record a transportation information related to the transport of equipment from central inventory location to one of a plurality of service centers using the equipment database and through an interface; and
   an installations/removals module operable to record installation/removal information regarding the installation and removal of equipment within an area serviced by one of the plurality of service centers using the equipment database through an interface.

2. The equipment information system of claim 1, further comprising:
   a stored procedure operable to access the data in the equipment database.

3. The equipment information system of claim 1, further comprising:
   a stored procedure operable to change the data in the equipment database.

4. The equipment information system of claim 2, wherein the stored procedure is executed periodically.

5. The equipment information system of claim 2, wherein the stored procedure is executed on-demand through a graphical user interface.

6. The equipment information system of claim 2, wherein the execution of the stored procedure is initiated through an external interface.

7. The equipment information system of claim 2, wherein the execution of the stored procedure is initiated through a second stored procedure.

8. The equipment information system of claim 1, further comprising:
   an external interface operable to exchange information with the equipment database.

9. The equipment information system of claim 1, further comprising:
   a stored procedure operable to automatically order equipment and to store the order in the equipment database.

10. The equipment information system of claim 1, wherein the equipment database includes data organized into tables.

11. The equipment information system of claim 1, wherein the database manager and the equipment database are provided at a server and the modules are provided as an executable at a client.

12. The equipment information system of claim 1, further comprising:

an allocation stored procedure operable to automatically allocate equipment through a stock number based on the receipt of an order.

13. A method for managing equipment information comprising:

storing attributes of a piece of equipment in an equipment information database that indicates the type of the equipment when the equipment is received at a central inventory location;

adding an indication in the equipment information database that the equipment is available inventory;

receiving an order for equipment needed at one of a plurality of service centers that is of the same type as the equipment;

allocating inventory to the order based on available inventory in the equipment information database;

shipping the equipment for the order to one of the plurality of service centers;

storing shipment attributes in the equipment information database related to shipment of the piece of equipment from the central inventory location to one of the plurality of service centers;

installing the equipment in an area serviced by the one of plurality of service centers where the equipment was shipped;

updating the equipment information database with installation information to indicate that the equipment has been installed and further to indicate the area where the equipment was installed and the one of the plurality of service centers associated with the area;

removing the equipment;

updating the equipment information database that the equipment has been removed and updating a removal information related to reasons for the removal; and shipping the equipment to the central inventory location.

14. The method for managing equipment information of claim 13, wherein the equipment is a transformer.

15. The method for managing equipment information of claim 13, wherein the attributes of the equipment includes serial number and manufacturer.

16. The method for managing equipment information of claim 13, wherein the storing attributes of a piece of equipment includes using a bar code scanner.

17. The method for managing equipment information of claim 13, wherein the order was received from an external system.

18. The method for managing equipment information of claim 13, further comprising:

deallocating the order after allocating the order.

19. The method for managing equipment information of claim 13, wherein the order was received from an automatically generated order.

20. The method for managing equipment information of claim 13, further comprising:

filling the order after allocating the order.

21. The equipment information system of claim 1, wherein the area where the equipment is installed is further defined as a geographical area serviced by one of the plurality of service centers.

22. The equipment information system of claim 21, wherein each of the plurality of service centers is associated with a different geographical area.

23. The equipment information system of claim 22, wherein the installation/removal modules are further operable to record an area information associated with the geographical area and further operable to record a service center information related to the service center associated with the geographical area where the equipment is installed and removed.

24. The equipment information system of claim 22, wherein the installation/removal modules are further operable to record an installation information specific to placing the equipment in service.

25. The equipment information system of claim 24, wherein the equipment is further defined as a transformer and wherein the installation information includes a transformer wiring information related to wiring the transformer placed in service in the geographic area.

26. The equipment information system of claim 22, wherein the installation/removal modules are further operable to record a removal information related to reason for removing the equipment from service.

27. The equipment information system of claim 1, wherein the equipment is further defined as capacitors.

28. The equipment information system of claim 1, wherein the equipment is further defined as switch gear.

29. The equipment information system of claim 1, wherein the transportation information related to the transport of equipment further includes a status information related to the status of equipment being shipped between the central inventory and one of the plurality of service centers.

30. The equipment information system of claim 29, wherein the transportation information further includes driver planning information.

31. The equipment information system of claim 30, wherein the transportation information further includes weight information related to the weight of the equipment to be shipped, a shipment time information related to the time for shipment of the equipment, a lading information related to bills of lading and loading documents for the equipment to be shipped.

32. The method of claim 13, wherein the area where the equipment is installed is further defined as a geographical area serviced by one of the plurality of service centers.

33. The method of claim 32, wherein each of the plurality of service centers is associated with a different geographical area.

34. The method of claim 33, wherein the installation/removal modules are further operable to record an area information associated with the geographical area and further operable to record a service center information related to the service center associated with the geographical area where the equipment is installed and removed.

35. The method of claim 13, wherein the shipment attributes stored in the equipment information database include:

a status information related to the status of equipment being shipped between the central inventory and one of the plurality of service centers;

a driver planning information;

a weight information related to the weight of the equipment to be shipped;

a shipment time information related to the time for shipment of the equipment; and a document information related to bills of lading and loading documents for the equipment to be shipped.

* * * * *

UNITED STATES PATENT AND TRADEMARK OFFICE
CERTIFICATE OF CORRECTION

PATENT NO. : 6,868,397 B1
DATED : March 15, 2005
INVENTOR(S) : McCaslin

It is certified that error appears in the above-identified patent and that said Letters Patent is hereby corrected as shown below:

Title page,
Item [56], References Cited, OTHER PUBLICATIONS, please insert
-- MUDIE et al., Faults: An equipment Maintenance and Repair System Using a Relational Database, IEEE/CHMT '90 IEMT Symposium, IEEE, October 1-3, 1990, pp. 41-46, Vol. SYMP 9. --.

Signed and Sealed this

Eleventh Day of October, 2005

JON W. DUDAS
*Director of the United States Patent and Trademark Office*